United States Patent
Ichikawa

(10) Patent No.: US 8,593,735 B2
(45) Date of Patent: Nov. 26, 2013

(54) IMAGE FORMING OPTICAL SYSTEM AND ELECTRONIC IMAGE PICKUP APPARATUS USING THE SAME

(75) Inventor: Keisuke Ichikawa, Tama (JP)

(73) Assignee: Olympus Corporation, Tokyo (JP)

( * ) Notice: Subject to any disclaimer, the term of this patent is extended or adjusted under 35 U.S.C. 154(b) by 322 days.

(21) Appl. No.: 13/066,725

(22) Filed: Apr. 22, 2011

(65) Prior Publication Data

US 2011/0267504 A1 Nov. 3, 2011

(30) Foreign Application Priority Data

Apr. 28, 2010 (JP) ................................ 2010-103730

(51) Int. Cl.
*G02B 15/14* (2006.01)
*G02B 15/20* (2006.01)

(52) U.S. Cl.
USPC .......................................... 359/686; 359/687

(58) Field of Classification Search
USPC ........... 348/240.3, 240.99; 359/681, 682, 686
See application file for complete search history.

(56) References Cited

U.S. PATENT DOCUMENTS 6,069,743 A * 5/2000 Nagata et al. ................. 359/687
6,829,101 B2 * 12/2004 Mihara et al. ................. 359/687
2002/0067551 A1 * 6/2002 Ohtake ........................... 359/687
2005/0219708 A1 * 10/2005 Shibayama et al. ........... 359/686
2007/0229974 A1 * 10/2007 Shibayama et al. ........... 359/686
2009/0059388 A1 * 3/2009 Miyata et al. ................. 359/686

FOREIGN PATENT DOCUMENTS

JP 04-104114 4/1992
JP 2008-102165 5/2008

* cited by examiner

*Primary Examiner* — Ricky Mack
*Assistant Examiner* — William Alexander
(74) *Attorney, Agent, or Firm* — Kenyon & Kenyon LLP

(57) ABSTRACT

An image forming optical system comprising four or five lens groups in total, wherein during zooming from the wide angle end to the telephoto end, the distance between the first lens group and the second lens group increases, the distance between the second lens group and the third lens group decreases, and the distance between the third lens group and the fourth lens group changes, the first lens group comprises three lenses including a negative meniscus lens, a positive meniscus lens, and a positive lens, the second lens group includes a negative meniscus lens having a convex surface directed toward the object side and a concave surface directed toward the image side, the negative meniscus lens being located closest to the object side in the second lens group, the position of the second lens group at the telephoto end is closer to the object side than that at the wide angle end, the image forming optical system has an aperture stop that moves integrally with the third lens group, the third lens group includes a positive lens component and a negative lens component, and the fourth lens group comprises one lens.

29 Claims, 19 Drawing Sheets

435.84 —··—··—
656.27 ---------
587.56 ————

435.84 —·—
656.27 -----
587.56 ——

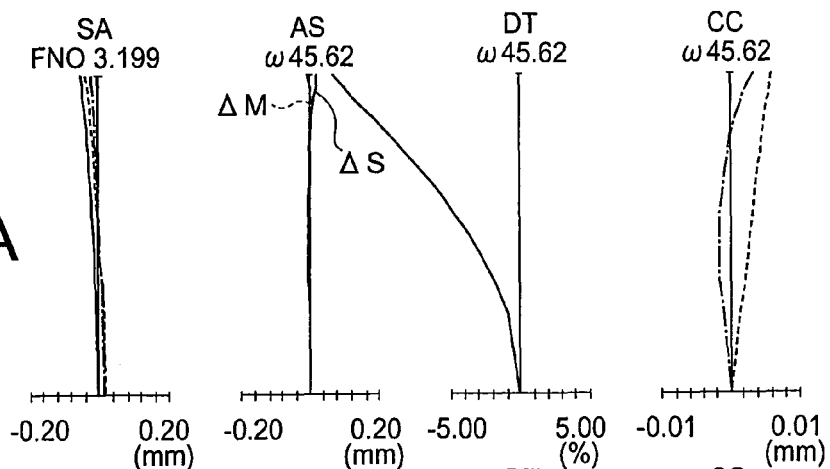
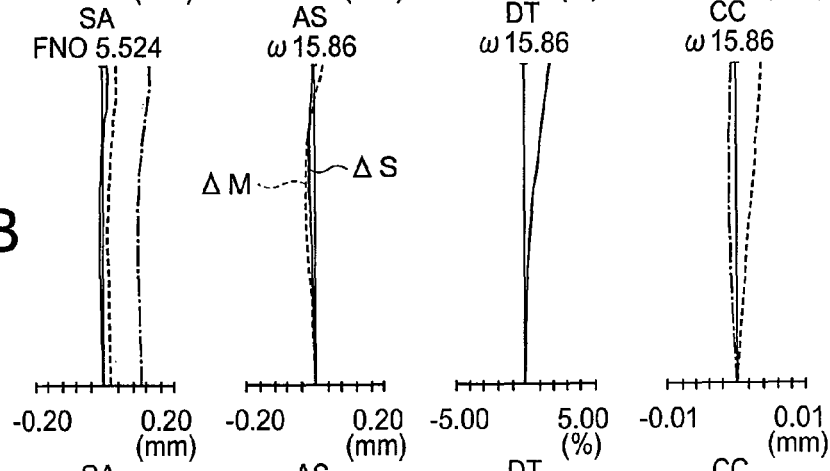
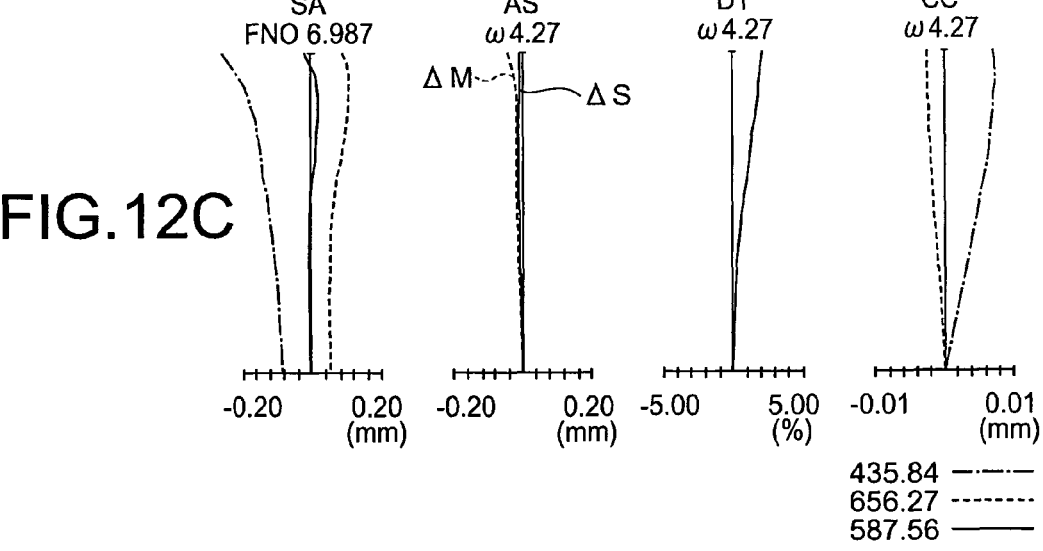

IMAGE FORMING OPTICAL SYSTEM AND ELECTRONIC IMAGE PICKUP APPARATUS USING THE SAME

CROSS-REFERENCE TO RELATED APPLICATION

The present application is based upon and claims the benefit of priority from the prior Japanese Patent Application No. 2010-103730 filed on Apr. 28, 2010; the entire contents of which are incorporated herein by reference.

BACKGROUND OF THE INVENTION

1. Field of the Invention

The present invention relates to an image forming optical system and an electronic image pickup apparatus equipped with the same.

2. Description of the Related Art

In recent years, digital cameras that pick up an image of an object using a solid state image pickup element such as a CCD or CMOS have replaced film cameras and become the mainstream. Furthermore, various categories of digital cameras ranging from popular-priced compact type cameras to advanced type cameras for professionals have been developed. The present invention is directed mainly to popular-priced compact type cameras.

Users of such popular-priced digital cameras generally wish to enjoy easy and simple shooting in various shooting situations anywhere at any time. For this reason, such users favor small size digital cameras, in particular cameras that are small in thickness and can be conveniently carried in a pocket of clothes or a bag.

Moreover, a further reduction in the size of the taking lens system of such cameras is demanded. In addition, zoom lenses that have a high zoom ratio and a wide angle of view at the wide angle end to allow shooting in various scenes are desired.

Japanese Patent Application Laid-Open Nos. 2008-102165 and 04-104114 disclose zoom lenses that can be designed to have a relatively high zoom ratio. The zoom lenses disclosed in these patent documents have, in order from the object side, a first lens group having a positive refracting power, a second lens group having a negative refracting power, a third lens group having a positive refracting power, and a fourth lens group having a positive refracting power, wherein zooming is performed by changing the distances between the lens groups.

SUMMARY OF THE INVENTION

An image forming optical system according to the present invention comprises four or five lens groups in total including, in order from its object side to image side, a first lens group having a positive refracting power, a second lens group having a negative refracting power, a third lens group having a positive refracting power, and a fourth lens group having a refracting power, wherein during zooming from the wide angle end to the telephoto end, the distance between the first lens group and the second lens group increases, the distance between the second lens group and the third lens group decreases, and the distance between the third lens group and the fourth lens group changes, the first lens group comprises three lenses including a negative meniscus lens, a positive meniscus lens, and a positive lens, the second lens group includes a negative meniscus lens having a convex surface directed toward the object side and a concave surface directed toward the image side, the negative meniscus lens being located closest to the object side in the second lens group, the position of the second lens group at the telephoto end is closer to the object side than that at the wide angle end, the image forming optical system has an aperture stop that moves integrally with the third lens group, the third lens group includes a positive lens component and a negative lens component, and the fourth lens group comprises one lens.

An electronic image pickup apparatus according to the present invention comprises an image forming optical system, and an image pickup element that has an image pickup surface provided on the image side of the image forming optical system and converts an optical image formed on the image pickup surface by the image forming optical system into an electrical signal.

BRIEF DESCRIPTION OF THE DRAWINGS

FIG. 2A is for the wide angle end, FIG. 2B is for the intermediate focal length, and FIG. 2C is for the telephoto end;

FIG. 4A is for the wide angle end, FIG. 4B is for the intermediate focal length, and FIG. 4C is for the telephoto end;

FIG. 6A is for the wide angle end, FIG. 6B is for the intermediate focal length, and FIG. 6C is for the telephoto end;

FIG. 8A is for the wide angle end, FIG. 8B is for the intermediate focal length, and FIG. 8C is for the telephoto end;

FIG. 10A is for the wide angle end, FIG. 10B is for the intermediate focal length, and FIG. 10C is for the telephoto end;

FIGS. 12A, 12B, and 12C are diagrams showing spherical aberration, astigmatism, distortion, and chromatic aberration of magnification of the zoom lens according to embodiment 6 in the state in which the zoom lens is focused on an object point at infinity, where FIG. 12A is for the wide angle end, FIG. 12B is for the intermediate focal length, and FIG. 12C is for the telephoto end;

FIG. 19A is a front view of the cellular phone 400, FIG. 19B is a side view of the cellular phone 400, and FIG. 19C is a cross sectional view of the taking optical system 405.

DETAILED DESCRIPTION OF THE INVENTION

Figure 1A:
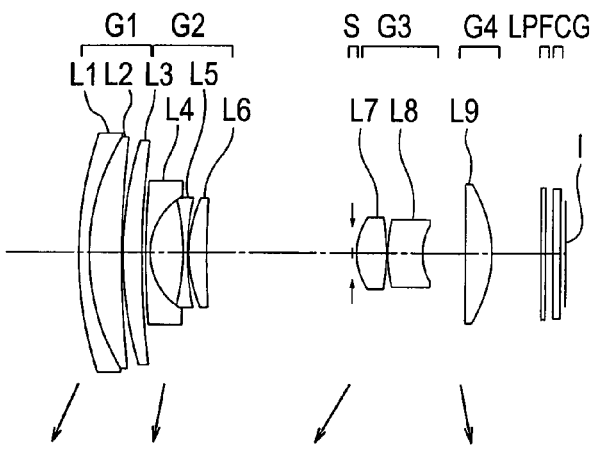
FIGS. 1A, 1B, and 1C are cross sectional views taken along the optical axis showing the optical configuration of a zoom lens according to embodiment 1 of the present invention in the state in which the zoom lens is focused on an object point at infinity, respectively at the wide angle end, at an intermediate focal length, and at the telephoto end.

In the following, embodiments of the image forming optical system in which an image forming optical system according to one or more modes of the invention is applied to zoom optical systems will be described in detail with reference to the drawings. The present invention is not limited by the embodiments. Prior to the description of the embodiments, the operation and effect of the image forming optical system according to some modes of the invention will be described.

The present invention is not limited by the modes described in the following. Although a lot of specific details may be described in the following description of the modes of the invention for the purposes of illustration, various modifications and changes may be made to the details without departing from the scope of the invention. Accordingly, the exemplary modes of the invention will be set forth in the following without any intension of invalidating the generality of or imposing any limitations upon the claimed invention.

An image forming optical system according to this mode has four or five lens groups in total including, in order from the object side to the image side, a first lens group having a positive refracting power, a second lens group having a negative refracting power, a third lens group having a positive refracting power, and a fourth lens group having a refracting power, wherein during zooming from the wide angle end to the telephoto end, the distance between the first lens group and the second lens group increases, the distance between the second lens group and the third lens group decreases, and the distance between the third lens group and the fourth lens group changes.

This type of image forming optical system having a positive-negative-positive lens group arrangement is advantageous in achieving an adequate zoom ratio. Furthermore, the exit pupil can easily be made distant from the image plane in this type of image forming optical system. Therefore, this type of image forming optical system is also advantageous in achieving good image quality when used with an electronic image pickup element.

In the image forming optical system according to this mode, the first lens group comprises three lenses including a negative meniscus lens, a positive meniscus lens, and a positive lens. This facilitates a reduction in the size of the first lens group with respect to the diametrical direction. Furthermore, the aberrations of the lenses cancel out, facilitating correction of aberrations in the first lens group. In consequence, the variation in aberrations can easily be made small in lenses that are small in size and have a wide angle of view and a high zoom ratio.

In the second lens group, a negative meniscus lens having a convex surface directed toward the object side and a concave surface directed toward the image side is provided closest to the object side.

The third lens group includes a positive lens and a negative lens.

A reduction in the number of the lenses is effective for a reduction in the size of the optical system in the collapsed state.

In the context of this specification, a lens component is defined as a lens member whose refractive surfaces that are in contact with air on an optical axis include only two surfaces or an object side refractive surface and an image side refractive surface.

In the image forming optical system according to this mode, the third lens group has the above-described configuration, facilitating a reduction in the size of the third lens group. Furthermore, the principal point of the third lens group is made closer to the second lens group. This facilitates achieving an adequate zoom ratio and a size reduction.

In order to reduce off-axis aberrations that may occur in optical systems having a wide angle of view and to provide the second lens group with a sufficient negative refracting power, the aforementioned negative meniscus lens is used as the lens component closest to the object side among the lens components in the second lens group. This facilitates making the angle of incidence of off-axis rays on this negative lens small at zoom positions near the wide angle end in optical systems having a wide angle of view. This facilitates a reduction in off-axis aberrations.

The fourth lens group comprises one positive lens component. This further facilitates a reduction in the collapsed size of the optical system.

In the above described invention, it is preferred that one or more of the following configurations and conditional expressions be satisfied at the same time.

In the image forming optical system according to the present invention, it is preferred that the position of the first lens group at the telephoto end be closer to the object side than that at the wide angle end. This facilitates achieving an adequate magnification changing effect provided by the second lens group.

It is preferred that the negative lens in the first lens group be located closer to the object side than the positive lens in the first lens group, the image side surface of the negative lens in the first lens group have a paraxial radius of curvature that is smaller in the absolute value than that of the object side surface thereof, and the image side surface of the positive lens in the first lens group have a paraxial radius of curvature that is larger in the absolute value than that of the object side surface thereof.

When this is the case, the thickness of the first lens group on the optical axis can be made small, and a reduction in aberrations is facilitated.

It is more preferred that the negative meniscus lens and the positive meniscus lens in the first lens group be meniscus lenses that are convex toward the object side.

When this is the case, the angle of incidence of off-axis rays on each of the lens surfaces in the first lens group at zoom positions near the wide angle end can be made small. This facilitates a reduction of aberrations in optical systems having a wide angle of view.

In order to reduce the decentering of the positive meniscus lens and the negative meniscus lens relative to each other, it is preferred that the positive meniscus lens and the negative meniscus lens be cemented together.

It is preferred that the second lens group be located closer to the object side at the telephoto end than at the wide angle end.

This movement of the second lens group facilitates achieving an adequate magnification changing effect provided by the second lens group and the third lens group and a reduction of the amount of variations in aberrations during zooming from the wide angle end to the telephoto end.

It is preferred that the second lens group have a positive lens and a negative lens located on the image side of the negative meniscus lens.

This configuration of the second lens group facilitates providing the second lens group with an adequate negative refracting power while reducing aberrations in the second lens group. This facilitates an increase in the angle of view. In addition, the achievement of an adequate refracting power of the second lens group facilitates a reduction in the magnification change that the third lens group is required to provide. This is advantageous in reducing the variation in aberrations during zooming.

In order to achieve a wide angle of view and a reduction in the size, it is preferred that the second lens group comprise a negative meniscus lens and the aforementioned negative lens and a positive lens.

It is preferred that the second lens group be composed of a front lens group having a negative refracting power and a rear lens group having a positive refracting power located on the image side, the front lens group comprising a negative meniscus lens and a negative lens located on the image side of the negative meniscus lens, the rear lens group comprising a positive lens component and including the aforementioned positive lens.

With this configuration, the principal point of the second lens group can be made closer to the object side. This facilitates a reduction in the size of the second lens group with respect to the diametrical direction. In other words, this facilitates a reduction in the size of optical systems having a wide angle of view.

In addition, the composite system made up of the first lens group and the second lens group has a symmetrical refracting power arrangement in which a positive refracting power (the first lens group), a negative refracting power (the front lens group in the second lens group), and a positive refracting power (the rear lens group in the second lens group) are arranged in order at zoom positions near the wide angle end.

Furthermore, the composite system made up of the second lens group and the third lens group has a symmetrical refracting power arrangement in which a negative refracting power (the front lens group in the second lens group), a positive refracting power (the rear lens group in the second lens group), a positive refracting power (the positive lens in the third lens group), and a negative refracting power (the negative lens in the third lens group) are arranged in order at zoom positions near the telephoto end.

Thus, a symmetrical refracting power arrangement, which is advantageous for aberration correction, can be achieved both at zoom positions near the wide angle end and at zoom positions near the telephoto end.

In the composite system made up of the first lens group and the second lens group, the Petzval sum, coma, and chromatic aberration of magnification cancel out at zoom positions near the wide angle end. This facilitates achieving an adequate angle of view and good performance.

In the composite system made up of the second lens group and the third lens group, the Petzval sum, coma, and chromatic aberration of magnification cancel out at zoom positions near the telephoto end. This facilitates achieving good optical performance in the zoom lens having a high zoom ratio.

It is preferred that the negative lens component in the second lens group have an aspheric surface.

The use of an aspheric lens surface in the negative lens component facilitates a reduction in the thickness of the second lens group and achieving good balance between axial aberrations and off-axis aberrations. This facilitates achieving a wide angle of view and an adequate zoom ratio.

The additional negative lens in the second lens group facilitates, in cooperation with the negative meniscus lens component, achieving an adequate negative refracting power of the second lens group and good balance between axial aberrations and off-axis aberrations.

Furthermore, when the negative lens has an aspheric surface, the thickness of the second lens group can easily be made small and off-axis aberrations also can readily be corrected at zoom positions near the wide angle end.

It is preferred that the third lens group be located closer to the object side at the telephoto end than at the wide angle end.

This facilitates achieving an adequate magnification changing effect provided by the third lens group.

It is preferred that an aperture stop be adapted to move integrally with the third lens group.

Moving the aperture stop in such a way as to be located closer to the object side at the telephoto end than at the wide angle end facilitates allowing the third lens group to move over a wide range. In addition, such a movement of the aperture stop makes it close to the third lens group both at the wide angle end and at the telephoto end, facilitating a reduction in the size and thickness of the third lens group.

It is preferred that the positive lens in the third lens group have a biconvex shape, and the negative lens in the third lens group have a meniscus shape with a concave surface facing the image side.

With this configuration, the principal point of the third lens group can easily be made closer to the object side, and the principal point of the third lens group can easily be made closer to the second lens group having a negative refracting power at the telephoto end. This facilitates achieving an adequate zoom ratio.

Both convex surfaces of the positive lens component and the convex object side surface of the negative lens component are arranged in succession along the optical axis. With this configuration, axial beams diverging from the second lens group are converged. This further facilitates a reduction in the size of the third lens group with respect to the diametrical direction.

In addition, aberrations generated by the convex surfaces in the third lens group can easily be canceled by the concave surface of the negative lens, and the convex surfaces in the third lens group refract off-axis beams away from the optical axis to ensure an adequate ray height of rays incident on the fourth lens group, thereby improving the telecentricity of the image forming optical system on its image side.

It is preferred that both the object side surface and the image side surface of the positive lens component in the third lens group be aspheric surfaces.

This facilitates correction of spherical aberration and coma. Then, good optical performance can easily be achieved even if the third lens group has two lenses. Providing two lenses in the third lens group is also advantageous for size reduction.

It is preferred that the image side surface of the negative lens in the third lens group be an aspheric surface.

This means that the lens surface closest to the image side in the third lens group is aspheric. This facilitates a reduction of off-axis aberrations.

It is preferred that the focusing operation from an object at a long distance to an object at a short distance be performed by moving the fourth lens group.

The fourth lens group can easily be made light in weight and the sensitivity of focusing to the movement of the fourth lens group can easily be made small. Therefore, by moving the fourth lens group for focusing, an adequate degree of accuracy in focusing can be achieved preferably.

Since the fourth lens group is required to have only a function of mainly adjusting the exit pupil, the refracting power of the fourth lens group may be low. Therefore, the fourth lens group may comprise one lens. This facilitates a reduction in the size and the cost.

When this is the case, the use of a meniscus lens having an aspheric surface as this lens that constitutes the fourth lens group will facilitate correction of off-axis aberrations. The image forming optical system may comprise only four lens groups including the first lens group, the second lens group, the third lens group, and the fourth lens group. This facilitates a reduction in the size.

Alternatively, the fifth lens group having a curved refracting surface may be provided on the image side of the fourth lens group. This facilitates correcting curvature of field or achieving adequate telecentricity.

Furthermore, if the fifth lens group is fixed during zooming from the wide angle end to the telephoto end, the mechanical construction can be made simple.

Preferred numerical conditions for the image forming optical system according to the above described modes of the invention will be described in the following.

It is preferred that the first lens group satisfy the following conditional expression (1):

$$-10<(R_{1gf}+R_{1gr})/(R_{1gf}-R_{1gr})<-1.5 \quad (1),$$

where $R_{1gf}$ is the paraxial radius of curvature of the lens surface located closest to the object side in the first lens group, and $R_{1gr}$ is the paraxial radius of curvature of the lens surface located closest to the image side in the first lens group.

Conditional expression (1) specifies preferred shapes of the first lens group.

If the lower and upper limits of conditional expression (1) are not exceeded, excessive or insufficient curvature of field caused with an increase in the angle of view can easily be prevented. In addition, satisfying this condition facilitates correction of chromatic aberration of magnification at the telephoto end.

It is preferred that the first lens group satisfy the following conditional expression (2):

$$-5.5<(R_{1f}+R_{1r})/(R_{1f}-R_{1r})<-2.5 \quad (2)$$

where $R_{1f}$ is the paraxial radius of curvature of the lens surface located closest to the object side in the first lens group, and $R_{1r}$ is the paraxial radius of curvature of the lens surface located closest to the image side in the first lens group.

Conditional expression (2) specifies preferred shapes of the first lens group.

If the lower and upper limits of conditional expression (2) are not exceeded, excessive or insufficient curvature of field caused with an increase in the angle of view can easily be prevented. In addition, satisfying this condition facilitates correction of chromatic aberration of magnification at the telephoto end.

It is preferred that the positions of the second lens group at the wide angle end and at the telephoto end satisfy the following conditional expression (10):

$$0<(T_{2W}-T_{2T})/f_W<2.5 \quad (10)$$

where $T_{2W}$ is the distance between the position of the object side surface of the second lens group at the wide angle end and the position of the image plane, $T_{2T}$ is the distance between the position of the object side surface of the second lens group at the telephoto end and the position of the image plane, and $f_W$ is the focal length of the entire image forming optical system at the wide angle end.

Conditional expression (10) specifies a preferred condition concerning the relationship between the position of the second lens group at the wide angle end and that at the telephoto end.

If the lower and upper limits of conditional expression (10) are not exceeded, excessive or insufficient curvature of field caused with the achievement of a high zoom ratio can easily be prevented. In addition, satisfying this condition facilitates correction of chromatic aberration of magnification at the telephoto end.

It is preferred that the negative meniscus lens component in the second lens group satisfy the following conditional expression:

$$0.9<(R_{2nf}+R_{2nr})/(R_{2nf}-R_{2nr})<1.5 \quad (3)$$

where $R_{2nf}$ is the paraxial radius of curvature of the object side surface of the negative meniscus lens component in the second lens group, and $R_{2nr}$ is the paraxial radius of curvature of the image side surface of the negative meniscus lens component in the second lens group.

Conditional expression (3) specifies preferred shapes of the negative meniscus lens component located closest to the object side in the second lens group.

The negative meniscus lens component may be designed in such a way that the upper limit of conditional expression (3) is not exceeded and have a convex surface directed toward the object side. This facilitates reducing the angle of incidence of off-axis beams on this negative meniscus lens component and correcting aberrations at the wide angle side.

The negative meniscus lens component may be designed in such a way that the lower limit of conditional expression (3) is not exceeded and have an image side surface with high curvature. This facilitates correcting spherical aberration at zoom positions near the telephoto end.

It is preferred that the first lens group and the negative meniscus lens component in the second lens group satisfy the following conditional expression (4):

$$-0.3 < f_{2n}/f_1 < -0.13 \quad (4),$$

where $f_{2n}$ is the focal length of the negative meniscus lens in the second lens group, and $f_1$ is the focal length of the first lens group.

Conditional expression (4) specifies preferred values of the ratio of the refracting power of the first lens group and the refracting power of the negative meniscus lens component in the second lens group.

If the lower limit of conditional expression (4) is not exceeded, the composite system made up of the first lens group and the negative meniscus lens can have an adequate negative refracting power. This facilitates achieving both a reduction in the size and a large angle of view.

If the upper limit of conditional expression (4) is not exceeded so that the first lens group has an adequate positive refracting power, correction of curvature of field is facilitated.

It is preferred that the negative lens in the third lens group satisfy the following conditional expression:

$$0.1 < (R_{3nf} + R_{3nr})/(R_{3nf} - R_{3nr}) < 4.5 \quad (5),$$

where $R_{3nf}$ is the paraxial radius of curvature of the object side surface of the negative lens in the third lens group, and $R_{3nr}$ is the paraxial radius of curvature of the image side surface of the negative lens in the third lens group.

Conditional expression (5) specifies preferred shapes of the negative lens in the third lens group.

The object side surface of the negative lens in the third lens group may be designed in such a way that the lower limit of conditional expression (5) is not exceeded and have a positive refracting power. This provides the effect of making the principal point of the third lens group closer to the object side and the effect of sharing the positive refracting power of the third lens group. This consequently facilitates achieving a reduction in the size and a high zoom ratio. In addition, this also facilitates achieving an adequate negative refracting power of the image side surface and canceling aberrations in the third lens group.

If the upper limit of conditional expression (5) is not exceeded so that the negative refracting power of the image side surface of the negative lens is prevented from becoming too high, coma and astigmatism can be made small.

It is preferred that the negative lens in the third lens group satisfy the following conditional expression:

$$12 < v_{3n} < 35 \quad (6),$$

where $v_{3n}$ is the Abbe constant of the negative lens in the third lens group.

Conditional expression (6) specifies preferred values of the Abbe constant of the material of the negative lens in the third lens group.

If the lower limit of conditional expression (6) is not exceeded, an increase in anomalous dispersion of the material of the negative lens can be prevented. This facilitates preventing a function of correcting chromatic aberration from becoming too high. In general, if the Abbe constant of an optical material becomes lower than 12, anomalous dispersion of the optical material drastically increases, and it becomes impossible to correct chromatic aberration.

If the upper limit of conditional expression (6) is not exceeded so that the negative lens has adequate dispersion, correction of chromatic aberration in the third lens group can be facilitated.

It is preferred that the positive lens and the negative lens in the third lens group satisfy the following conditional expression:

$$30 < v_{3p} - v_{3n} < 70 \quad (7),$$

where $v_{3p}$ is the Abbe constant of the positive lens in the third lens group, and $v_{3n}$ is the Abbe constant of the negative lens in the third lens group.

Conditional expression (7) specifies preferred range of the difference between the Abbe constant of the positive lens in the third lens group and that of the negative lens in the third lens group.

If the difference in the Abbe constant between the two lenses is so large as not to exceed the lower limit of conditional expression (7), a reduction of chromatic aberration in the third lens group will be facilitated, and a reduction of chromatic aberration throughout the entire zoom range will be facilitated.

If the upper limit of conditional expression (7) is not exceeded, a reduction in the cost of the materials of the lenses to be used and the ease of machining of the lenses are facilitated.

It is preferred that the image forming optical system satisfy the following conditional expression:

$$7 < ft/fw \quad (8),$$

where fw is the focal length of the entire image forming optical system at the wide angle end, and ft is the focal length of the entire image forming optical system at the telephoto end.

Conditional expression (8) specifies preferred values of the zoom ratio of the entire image forming optical system.

If the lower limit of conditional expression (8) is not exceeded so that the zoom lens has an adequate zoom ratio, the zoom lens can be suitably used in various shooting situations. This is desirable.

An electronic image pickup apparatus according to the present invention comprises an image forming optical system according to any one of the above described modes, and an image pickup element that has an image pickup surface disposed on the image side of the image forming optical system and converts an optical image formed on the image pickup surface by the image forming optical system into an electrical signal.

With this configuration, there can be provided an electronic image pickup apparatus equipped with an image forming optical system that is advantageous in achieving a high zoom ratio, an adequate angle of view, and good optical performance while being compact.

The electronic image pickup apparatus further has a signal processing circuit that processes image data obtained by picking up an image by the image pickup element and outputs image data representing the image having a changed shape.

It is preferred that the following conditional expression (9) be satisfied in the state in which the image forming optical system is focused on an object at the farthest distance at the wide angle end.

$$0.65 < y_{07}/(fw \cdot \tan \omega_{07w}) < 0.98 \qquad (9),$$

where fw is the focal length of the entire image forming optical system at the wide angle end, and $y_{07}$ is expressed by equation $y_{07}=0.7 \times y_{10}$, $y_{10}$ being the distance from the center of an effective image pickup area of the image pickup element to a point farthest from the center within the effective image pickup area and having a largest value among the possible values if the effective image pickup area changes during zooming from the wide angle end to the telephoto end, and $\omega_{07w}$ is the angle formed in the object space between the optical axis and a principal ray that is incident on an image position having an image height equal to $y_{07}$ from the center of the image pickup surface at the wide angle end.

In the image forming optical system according to this mode, there tends to be a trade-off between correction of astigmatism and correction of barrel distortion. Therefore, the image forming optical system according to this mode may be allowed to show distortion to some extent, and the distortion in the shape of images may be corrected by an image processing function provided by the electronic image pickup apparatus equipped with the image forming optical system.

Suppose that an image of an object at infinity is formed by an optical system free from distortion. In this case, since the image has no distortion, the following equation holds:

$$f = y/\tan \omega \qquad (A).$$

Here, y is the height of the image point from the optical axis, f is the focal length of the image forming optical system, and ω is the angle of the direction toward an object point corresponding to an image point formed at a position at distance y from the center of the image pickup surface with respect to the optical axis.

On the other hand, if an optical system is allowed to have barrel distortion only at zoom positions near the wide angle end, the following inequality holds:

$$f > y/\tan \omega \qquad (B).$$

This means that if the values of ω and y are constant, the focal length f at the wide angle end may be large. Therefore, it is easy to design an optical system with reduced aberrations (in particular astigmatism).

In view of the above, the electronic image pickup apparatus according to the present invention is adapted to process image data obtained through the electronic image pickup element by image processing. In this processing, the image data (or the shape of the image) is transformed in such a way as to correct barrel distortion. Thus, image data finally obtained will be image data having a shape substantially similar to the object. Therefore, an image of the object based on this image data may be output to a CRT or a printer.

When the above-described correction of image data is applied, an effective image pickup area at the wide angle end has a barrel shape. The image data on the effective image pickup area having a barrel shape is transformed into an image data having a substantially rectangular shape.

Conditional expression (9) concerns the degree of barrel distortion at the wide angle end. If conditional expression (9) is satisfied, astigmatism can be corrected without difficulties. An image having barrel distortion is photo-electrically converted by the image pickup element into image data having barrel distortion. In the image processing unit, which is a signal processing system of the electronic image pickup apparatus, the image data having barrel distortion is subject to the electrical processing of changing the shape of the image.

Thus, when the image data finally output from the image processing unit is reproduced on a display apparatus, distortion has been corrected, and an image substantially similar to the shape of the object can be obtained.

If the lower limit of conditional expression (9) is not exceeded, distortion caused by the image forming optical system can be made small. Therefore, when distortion of the image caused by the distortion of the image forming optical system is corrected by the signal processing circuit, the ratio of extension of the image in the radial direction in the peripheral region of the corrected image can be made small. This facilitates a reduction in deterioration of sharpness in the peripheral region of the image.

If the upper limit of conditional expression (9) is not exceeded and distortion caused by the image forming optical system is allowed, astigmatism in the image forming optical system can easily be corrected. This facilitates a reduction in the thickness of the image forming optical system.

An effective image pickup area at the wide angle end may be determined in such a way as to correct barrel distortion completely. Alternatively, image data may be changed into an image having an appropriate degree of barrel distortion (e.g. approximately −3% or approximately −5%) taking into consideration the effect of perspective or deterioration of a peripheral image.

Chromatic aberration of magnification can also be corrected by adjusting the correction amounts of distortion of the respective color signals (for example, R (red), G (green), and B (blue) signals).

If the above described image forming optical system has a focusing function, the values presented in the description of the above described modes are for the state in which the zoom lens is focused on an object at infinity.

It is more preferred that two or more of the above described features be adopted at the same time.

It is more preferred that the range of each of the conditional expressions be further limited as follows. With such further limitations, the advantageous effects of the present invention can be achieved more effectively.

In conditional expression (1), it is more preferred that the lower limit value be −9.5, still more preferably −9, and the upper limit value be −2, still more preferably −2.5.

In conditional expression (2), it is more preferred that the lower limit value be −5, still more preferably −4.5, and the upper limit value be −2, still more preferably −1.8.

In conditional expression (3), it is more preferred that the lower limit value be 1, still more preferably 1.05, and the upper limit value be 1.4, still more preferably 1.3.

In conditional expression (4), it is more preferred that the lower limit value be −0.20, still more preferably −0.19, and the upper limit value be −0.14, still more preferably −0.15.

In conditional expression (5), it is more preferred that the lower limit value be 0.3, still more preferably 0.4, and the upper limit value be 4, still more preferably 3.5.

In conditional expression (6), it is more preferred that the lower limit value be 14, still more preferably 16, and the upper limit value be 28, still more preferably 20.

In conditional expression (7), it is more preferred that the lower limit value be 35, still more preferably 38, and the upper limit value be 60, still more preferably 51.

In conditional expression (8), it is more preferred that the lower limit value be 8, still more preferably 9, and it is preferred that the upper limit value be defined. If the upper limit value equal to 15 is not exceeded, a reduction in the entire length will achieved, and variations in aberrations will be made small. This is preferable.

In conditional expression (9), it is more preferred that the lower limit value be 0.7, still more preferably 0.75, and the upper limit value be 0.96, still more preferably 0.95.

In conditional expression (10), it is more preferred that the upper limit value be 2.0, still more preferably 2.5.

In the following, embodiments of the image forming optical system will be described. The imaging forming optical system according to each embodiment has some or all of the above described features in combination and is composed of a small number of lenses. The image forming optical systems according to the embodiments are advantageous in reducing the size in the collapsed state and achieving a high optical performance while having a zoom ratio as high as approximately 7 and a wide angle of view.

Figure 1B:
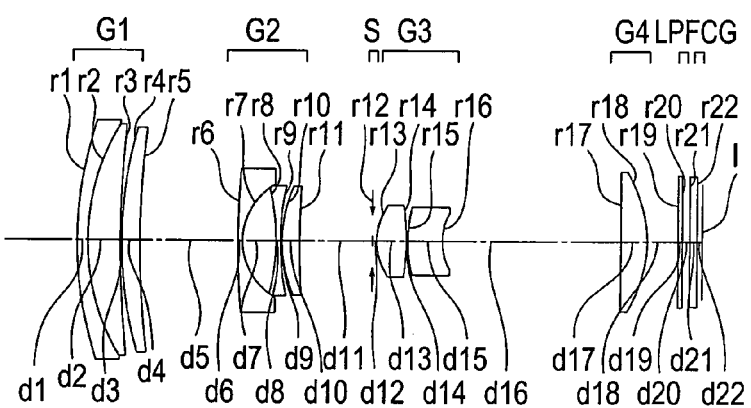
Figure 1C:
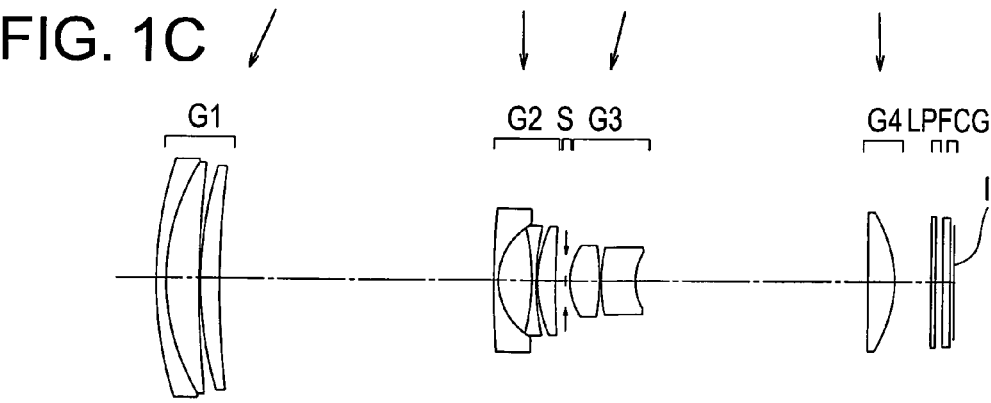

Now, a zoom lens according to embodiment 1 of the present invention will be described. FIGS. 1A, 1B, and 10 are cross sectional views taken along the optical axis showing the optical configuration of the zoom lens according to embodiment 1 of the present invention in the state in which the zoom lens is focused on an object point at infinity, where FIG. 1A is a cross sectional view of the zoom lens at the wide angle end, FIG. 1B is a cross sectional view of the zoom lens at an intermediate focal length position, and FIG. 10 is a cross sectional view of the zoom lens at the telephoto end.

Figure 2A:
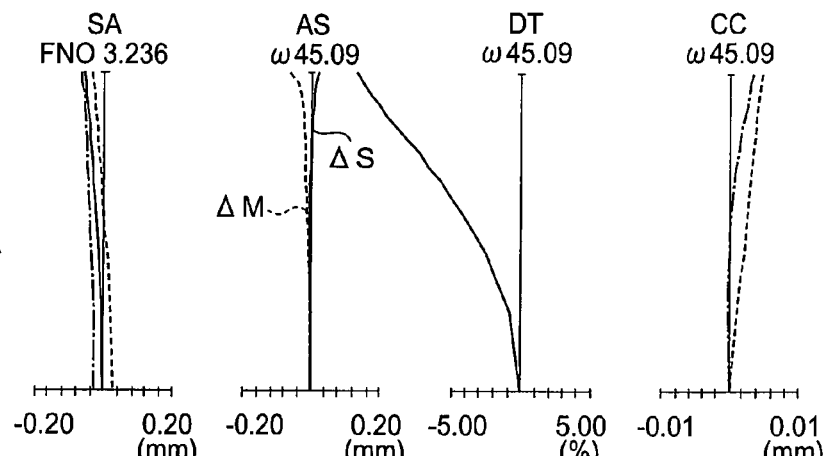
FIGS. 2A, 2B, and 2C are diagrams showing spherical aberration, astigmatism, distortion, and chromatic aberration of magnification of the zoom lens according to embodiment 1 in the state in which the zoom lens is focused on an object point at infinity, where
Figure 2B:
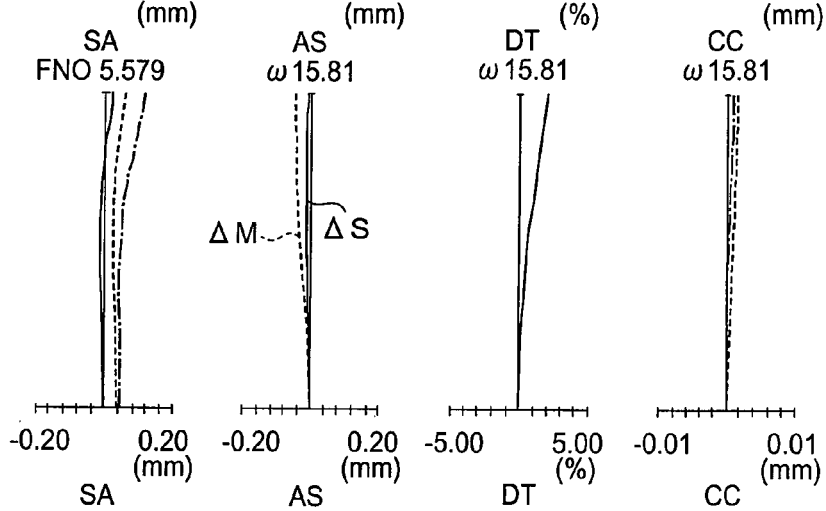
Figure 2C:
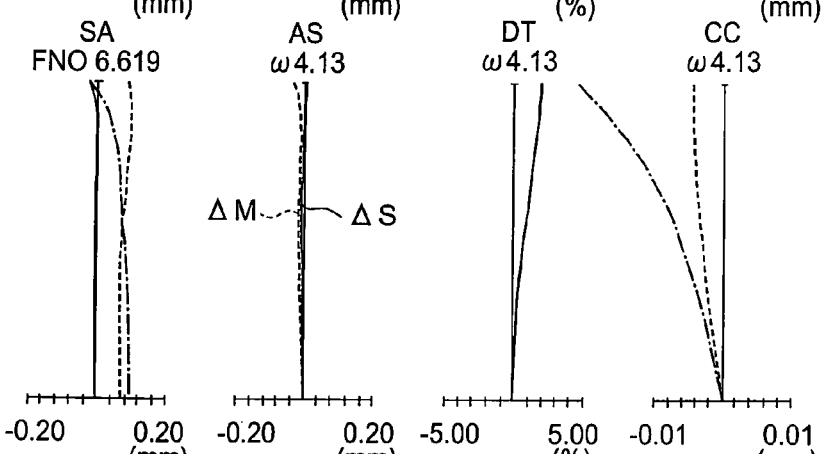

FIGS. 2A, 2B, and 2C are diagrams showing spherical aberration (SA), astigmatism (AS), distortion (DT), and chromatic aberration of magnification (CC) of the zoom lens according to embodiment 1 in the state in which the zoom lens is focused on an object point at infinity, where FIG. 2A is for the wide angle end, FIG. 2B is for the intermediate focal length position, and FIG. 2C is for the telephoto end. The sign "ω" in the diagrams represents half angle of view. The signs in the aberration diagrams are commonly used also in the embodiments described in the following.

As shown in FIGS. 1A, 1B, and 10, the zoom lens according to embodiment 1 includes, in order from its object side, a first lens group G1, a second lens group G2, an aperture stop S, a third lens group G3, and a fourth lens group G4. In the cross sectional views of the lenses according to this and all the embodiments described in the following, LPF denotes a low pass filter, CG denotes a cover glass, and I denotes the image pickup surface of an electronic image pickup element.

The first lens group G1 is composed of a cemented lens made up of a negative meniscus lens L1 having a convex surface directed toward the object side and a positive meniscus lens L2 having a convex surface directed toward the object side, and a positive meniscus lens L3 having a convex surface directed toward the object side. The first lens group G1 has a positive refracting power as a whole.

The second lens group G2 is composed of a negative meniscus lens L4 having a convex surface directed toward the object side, a biconcave negative lens L5, and a positive meniscus lens L6 having a convex surface directed toward the object side. The second lens group G2 has a negative refracting power as a whole.

The third lens group G3 is composed of a biconvex positive lens L7 and a negative meniscus lens L8 having a convex surface directed toward the object side. The third lens group G3 has a positive refracting power as a whole.

The fourth lens group G4 is composed of a positive meniscus lens L9 having a convex surface directed toward the image side. The fourth lens group G4 has a positive refracting power as a whole.

During zooming from the wide angle end to the telephoto end, the first lens group G1 moves toward the object side, the second lens group G2 moves first toward the object side and thereafter back toward the image side, the aperture stop S moves together with the third lens group G3, the third lens group G3 moves toward the object side, and the fourth lens group G4 moves first toward the image side and thereafter back toward the object side.

There are five aspheric surfaces in total, which include both surfaces of the biconvex positive lens L7 in the third lens group G3, the image side surface of the negative meniscus lens L8 in the third lens group G3, and the image side surface of the positive meniscus lens L9 in the fourth lens group G4.

Figure 3A:
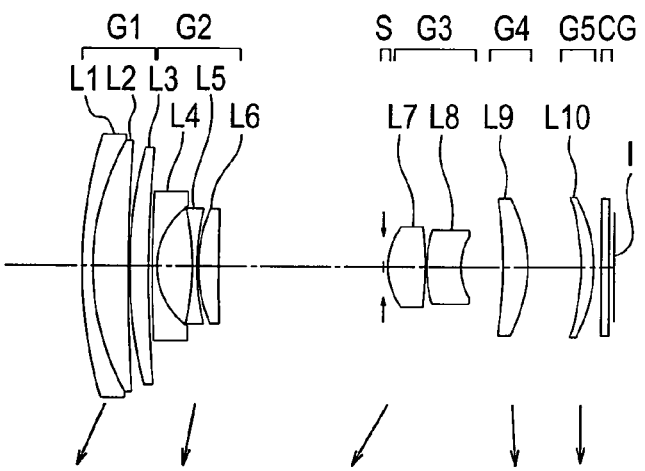
FIGS. 3A, 3B, and 3C are cross sectional views taken along the optical axis showing the optical configuration of a zoom lens according to embodiment 2 of the present invention in the state in which the zoom lens is focused on an object point at infinity, respectively at the wide angle end, at an intermediate focal length, and at the telephoto end.
Figure 3B:
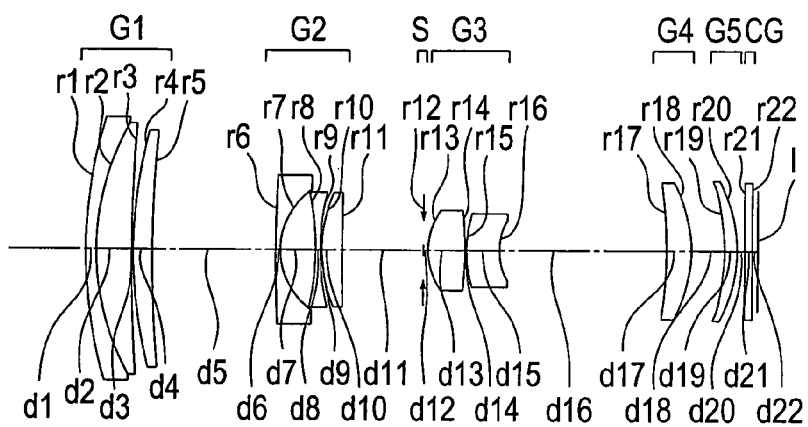
Figure 3C:
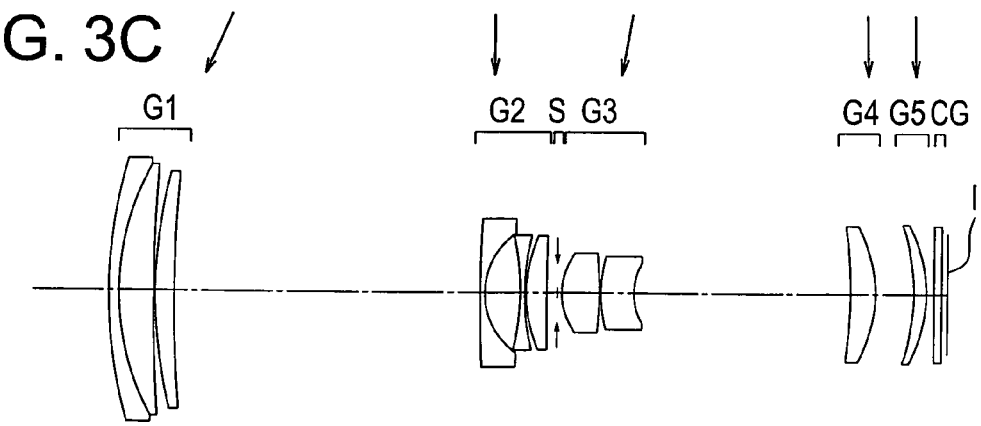

Next, a zoom lens according to embodiment 2 of the present invention will be described. FIGS. 3A, 3B, and 3C are cross sectional views taken along the optical axis showing the optical configuration of the zoom lens according to embodiment 2 of the present invention in the state in which the zoom lens is focused on an object point at infinity, where FIG. 3A is a cross sectional view of the zoom lens at the wide angle end, FIG. 3B is a cross sectional view of the zoom lens at an intermediate focal length position, and FIG. 3C is a cross sectional view of the zoom lens at the telephoto end.

Figure 4A:
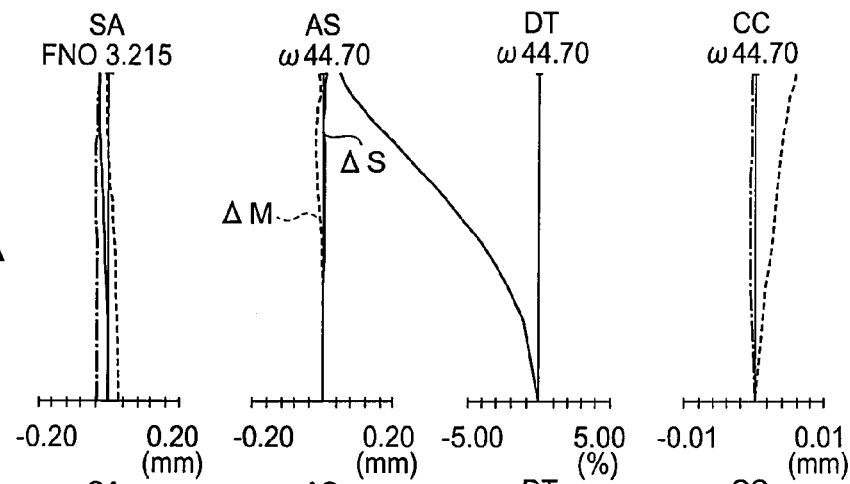
FIGS. 4A, 4B, and 4C are diagrams showing spherical aberration, astigmatism, distortion, and chromatic aberration of magnification of the zoom lens according to embodiment 2 in the state in which the zoom lens is focused on an object point at infinity, where
Figure 4B:
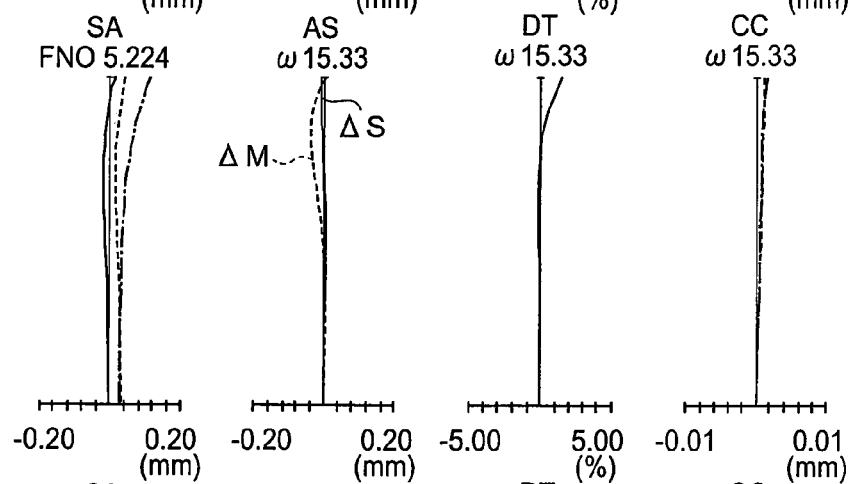
Figure 4C:
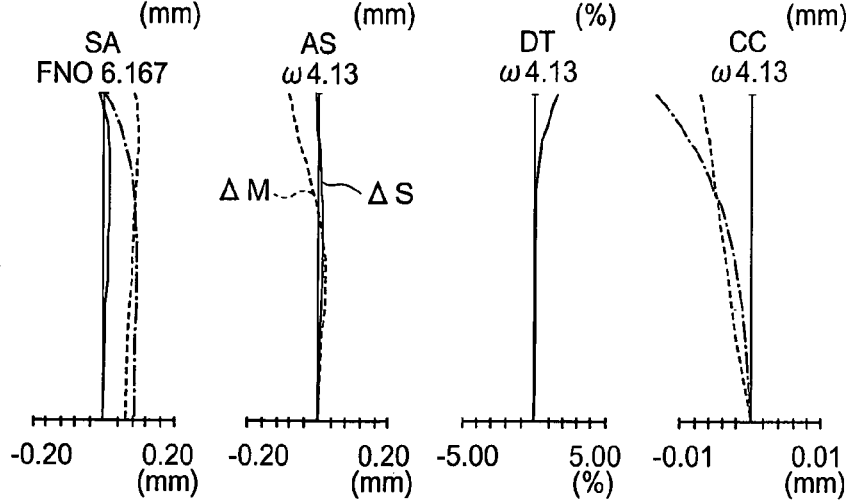

FIGS. 4A, 4B, and 4C are diagrams showing spherical aberration (SA), astigmatism (AS), distortion (DT), and chromatic aberration of magnification (CC) of the zoom lens according to embodiment 2 in the state in which the zoom lens is focused on an object point at infinity, where FIG. 4A is for the wide angle end, FIG. 4B is for the intermediate focal length position, and FIG. 4C is for the telephoto end.

As shown in FIGS. 3A, 3B, and 3C, the zoom lens according to embodiment 2 includes, in order from its object side, a first lens group G1, a second lens group G2, an aperture stop S, a third lens group G3, and a fourth lens group G4.

The first lens group G1 is composed of a cemented lens made up of a negative meniscus lens L1 having a convex surface directed toward the object side and a positive meniscus lens L2 having a convex surface directed toward the object side, and a positive meniscus lens L3 having a convex surface directed toward the object side. The first lens group G1 has a positive refracting power as a whole.

The second lens group G2 is composed of a negative meniscus lens L4 having a convex surface directed toward the object side, a biconcave negative lens L5, and a positive meniscus lens L6 having a convex surface directed toward the object side. The second lens group G2 has a negative refracting power as a whole.

The third lens group G3 is composed of a biconvex positive lens L7 and a positive meniscus lens L8 having a convex surface directed toward the object side. The third lens group G3 has a positive refracting power as a whole.

The fourth lens group G4 is composed of a positive meniscus lens L9 having a convex surface directed toward the image side. The fourth lens group G4 has a positive refracting power as a whole.

The fifth lens group G5 is composed of a positive meniscus lens L10 having a convex surface directed toward the image side. The fifth lens group G5 has a positive refracting power as a whole.

During zooming from the wide angle end to the telephoto end, the first lens group G1 moves toward the object side, the second lens group G2 moves first toward the object side and thereafter back toward the image side, the aperture stop S moves together with the third lens group G3, the third lens group G3 moves toward the object side, the fourth lens group G4 moves first toward the image side and thereafter back toward the object side, and the fifth lens group G5 is fixed.

There are five aspheric surfaces in total, which include both surfaces of the biconvex positive lens L7 in the third lens group G3, the image side surface of the negative meniscus lens L8 in the third lens group G3, the image side surface of the positive meniscus lens L9 in the fourth lens group G4, and the object side surface of the positive meniscus lens L10 in the fifth lens group G5.

Figure 5A:
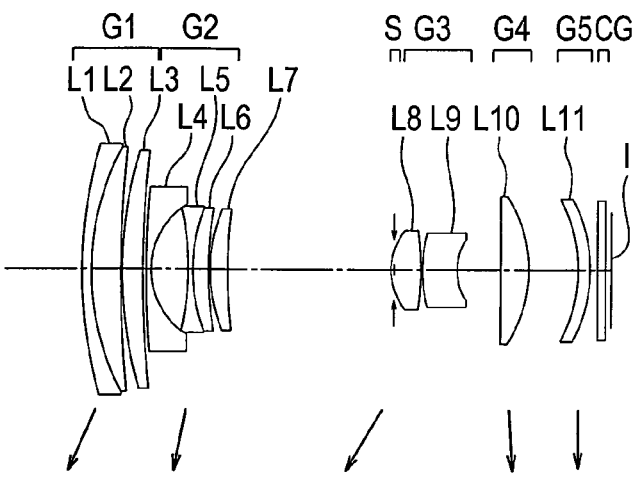
FIGS. 5A, 5B, and 5C are cross sectional views taken along the optical axis showing the optical configuration of a zoom lens according to embodiment 3 of the present invention in the state in which the zoom lens is focused on an object point at infinity, respectively at the wide angle end, at an intermediate focal length, and at the telephoto end.
Figure 5B:
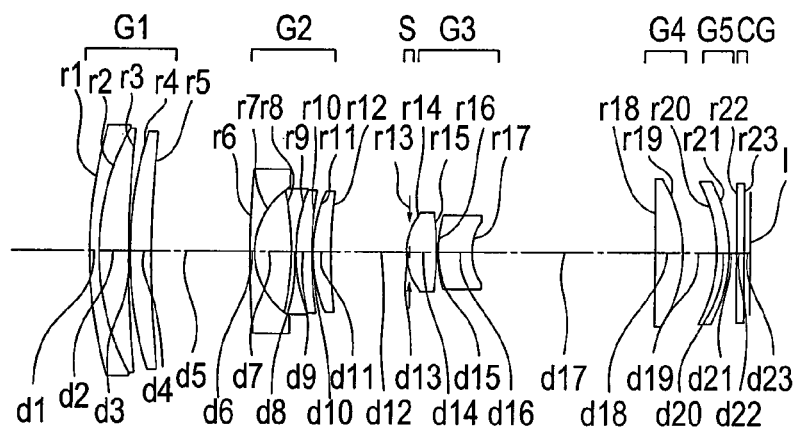
Figure 5C:
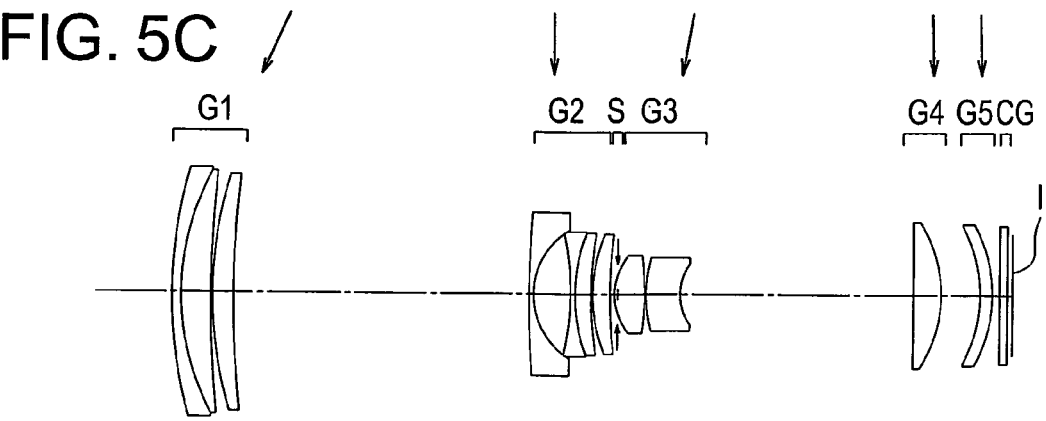

Next, a zoom lens according to embodiment 3 of the present invention will be described. FIGS. 5A, 5B, and 5C are cross sectional views taken along the optical axis showing the optical configuration of the zoom lens according to embodiment 3 of the present invention in the state in which the zoom lens is focused on an object point at infinity, where FIG. 5A is a cross sectional view of the zoom lens at the wide angle end, FIG. 5B is a cross sectional view of the zoom lens at an intermediate focal length position, and FIG. 5C is a cross sectional view of the zoom lens at the telephoto end.

Figure 6A:
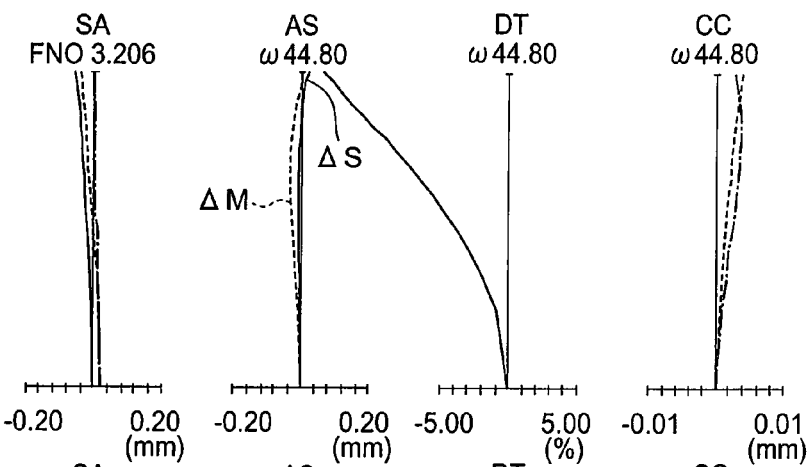
FIGS. 6A, 6B, and 6C are diagrams showing spherical aberration, astigmatism, distortion, and chromatic aberration of magnification of the zoom lens according to embodiment 3 in the state in which the zoom lens is focused on an object point at infinity, where
Figure 6B:
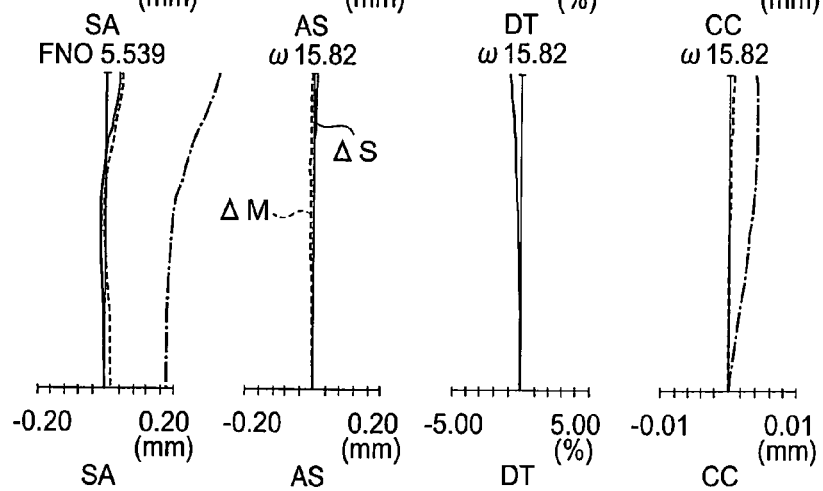
Figure 6C:
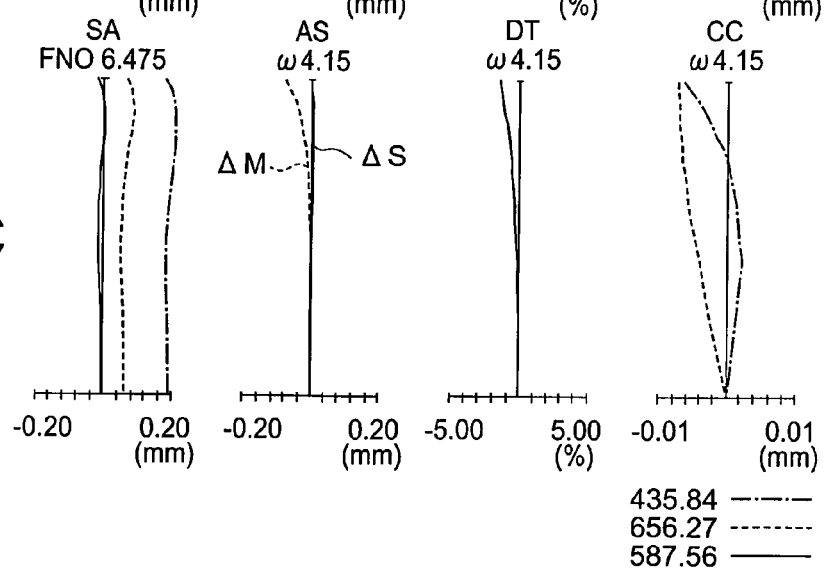

FIGS. 6A, 6B, and 6C are diagrams showing spherical aberration (SA), astigmatism (AS), distortion (DT), and chromatic aberration of magnification (CC) of the zoom lens according to embodiment 3 in the state in which the zoom lens is focused on an object point at infinity, where FIG. 6A is for the wide angle end, FIG. 6B is for the intermediate focal length position, and FIG. 6C is for the telephoto end.

As shown in FIGS. 5A, 5B, and 5C, the zoom lens according to embodiment 3 includes, in order from its object side, a first lens group G1, a second lens group G2, an aperture stop S, a third lens group G3, the fourth lens group G4, and a fifth lens group G5.

The first lens group G1 is composed of a cemented lens made up of a negative meniscus lens L1 having a convex surface directed toward the object side and a positive meniscus lens L2 having a convex surface directed toward the object side, and a positive meniscus lens L3 having a convex surface directed toward the object side. The first lens group G1 has a positive refracting power as a whole.

The second lens group G2 is composed of a negative meniscus lens L4 having a convex surface directed toward the object side, a cemented lens made up of the biconcave negative lens L5 and a positive meniscus lens L6 having a convex surface directed toward the object side, and a positive meniscus lens L7 having a convex surface directed toward the object side. The second lens group G2 has a negative refracting power as a whole.

The third lens group G3 is composed of a biconvex positive lens L8 and a negative meniscus lens L9 having a convex surface directed toward the object side. The third lens group G3 has a positive refracting power as a whole.

The fourth lens group G4 is composed of a positive meniscus lens L10 having a convex surface directed toward the image side. The fourth lens group G4 has a positive refracting power as a whole.

The fifth lens group G5 is composed of a positive meniscus lens L11 having a convex surface directed toward the image side. The fifth lens group G5 has a positive refracting power as a whole.

During zooming from the wide angle end to the telephoto end, the first lens group G1 moves toward the object side, the second lens group G2 moves first toward the object side and thereafter back toward the image side, the aperture stop S moves together with the third lens group G3, the third lens group G3 moves toward the object side, the fourth lens group G4 moves first toward the image side and thereafter back toward the object side, and the fifth lens group G5 is fixed.

There are two aspheric surfaces in total, which include the object side surface of the biconvex positive lens L8 and the image side surface of the negative meniscus lens L9 in the third lens group G3.

Figure 7A:
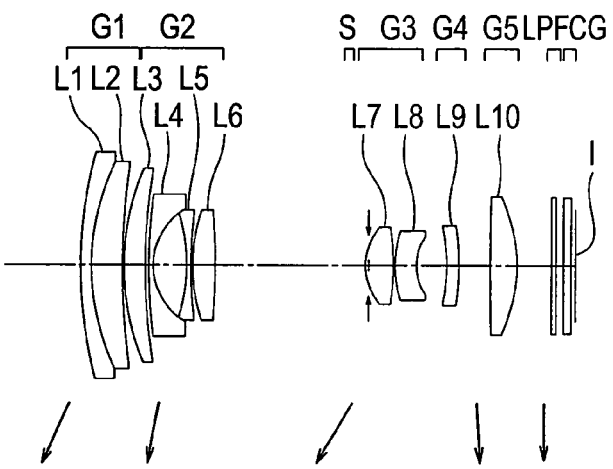
FIGS. 7A, 7B, and 7C are cross sectional views taken along the optical axis showing the optical configuration of a zoom lens according to embodiment 4 of the present invention in the state in which the zoom lens is focused on an object point at infinity, respectively at the wide angle end, at an intermediate focal length, and at the telephoto end.
Figure 7B:
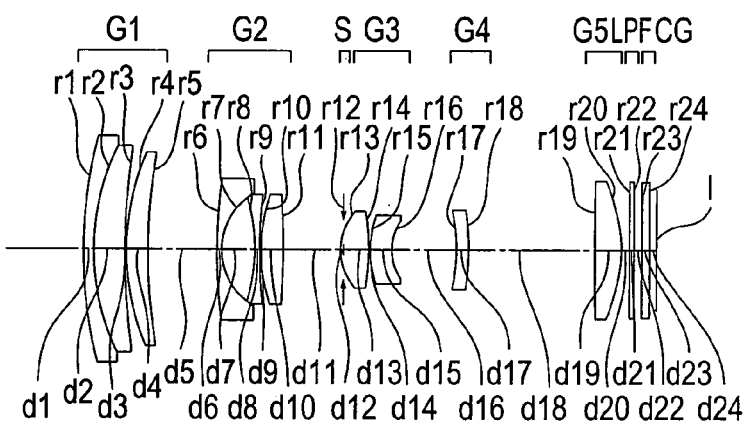
Figure 7C:
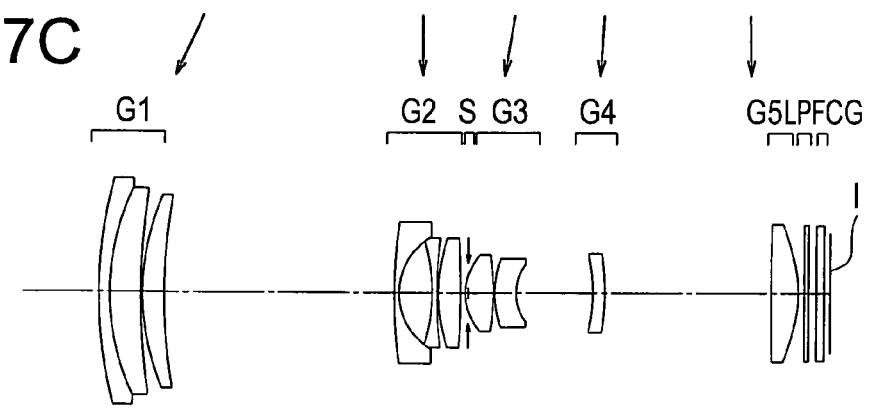

Next, a zoom lens according to embodiment 4 of the present invention will be described. FIGS. 7A, 7B, and 7C are cross sectional views taken along the optical axis showing the optical configuration of the zoom lens according to embodiment 4 of the present invention in the state in which the zoom lens is focused on an object point at infinity, where FIG. 7A is a cross sectional view of the zoom lens at the wide angle end, FIG. 7B is a cross sectional view of the zoom lens at an intermediate focal length position, and FIG. 7C is a cross sectional view of the zoom lens at the telephoto end.

Figure 8A:
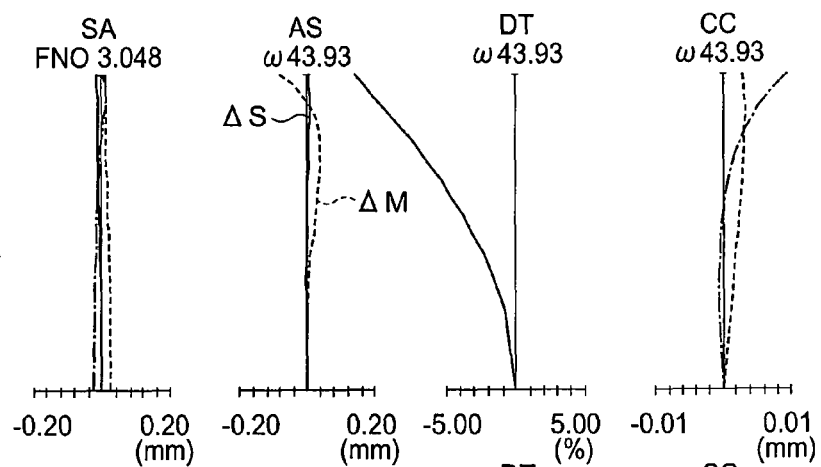
FIGS. 8A, 8B, and 8C are diagrams showing spherical aberration, astigmatism, distortion, and chromatic aberration of magnification of the zoom lens according to embodiment 4 in the state in which the zoom lens is focused on an object point at infinity, where
Figure 8B:
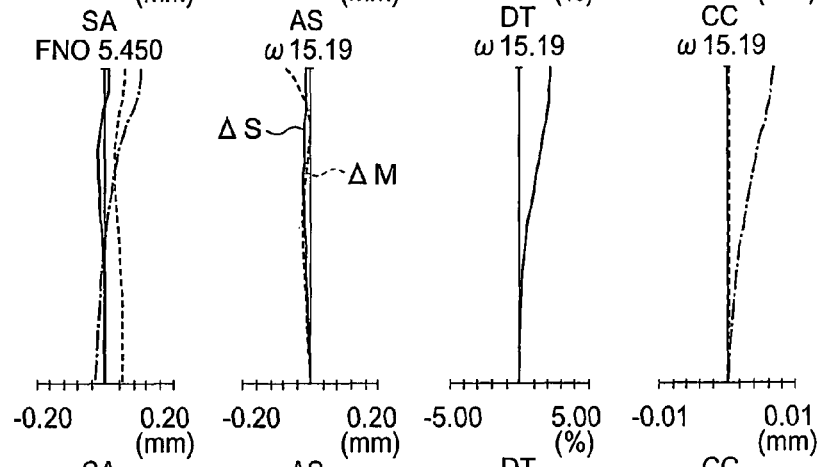
Figure 8C:
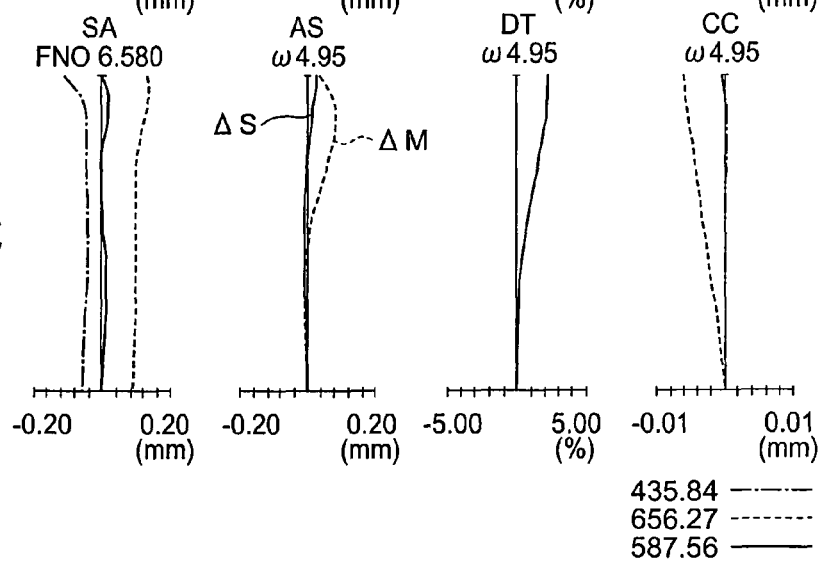

FIGS. 8A, 8B, and 8C are diagrams showing spherical aberration (SA), astigmatism (AS), distortion (DT), and chromatic aberration of magnification (CC) of the zoom lens according to embodiment 4 in the state in which the zoom lens is focused on an object point at infinity, where FIG. 8A is for the wide angle end, FIG. 8B is for the intermediate focal length position, and FIG. 8C is for the telephoto end.

As shown in FIGS. 7A, 7B, and 7C, the zoom lens according to embodiment 4 includes, in order from its object side, a first lens group G1, a second lens group G2, an aperture stop S, a third lens group G3, a fourth lens group G4, and a fifth lens group G5.

The first lens group G1 is composed of a cemented lens made up of a negative meniscus lens L1 having a convex surface directed toward the object side and a positive meniscus lens L2 having a convex surface directed toward the object side, and a positive meniscus lens L3 having a convex surface directed toward the object side. The first lens group G1 has a positive refracting power as a whole.

The second lens group G2 is composed of a negative meniscus lens L4 having a convex surface directed toward the object side, a biconcave negative lens L5, and a biconvex positive lens L6. The second lens group G2 has a negative refracting power as a whole.

The third lens group G3 is composed of a biconvex positive lens L7 and a negative meniscus lens L8 having a convex surface directed toward the object side. The third lens group G3 has a positive refracting power as a whole.

The fourth lens group G4 is composed of a negative meniscus lens L9 having a convex surface directed toward the image side. The fourth lens group G4 has a negative refracting power as a whole.

The fifth lens group G5 is composed of a biconvex positive lens L10. The fifth lens group G5 has a positive refracting power as a whole.

During zooming from the wide angle end to the telephoto end, the first lens group G1 moves toward the object side, the second lens group G2 moves first toward the object side and thereafter back toward the image side, the aperture stop S moves together with the third lens group G3, the third lens group G3 moves toward the object side, the fourth lens group G4 moves first toward the object side, and the fifth lens group G5 is fixed.

There are four aspheric surfaces in total, which include both surfaces of the biconvex positive lens L7 in the third lens group G3, the image side surface of the negative meniscus lens L8 in the third lens group G3, and the image side surface of the biconvex positive lens in the fifth lens group G5.

Figure 9A:
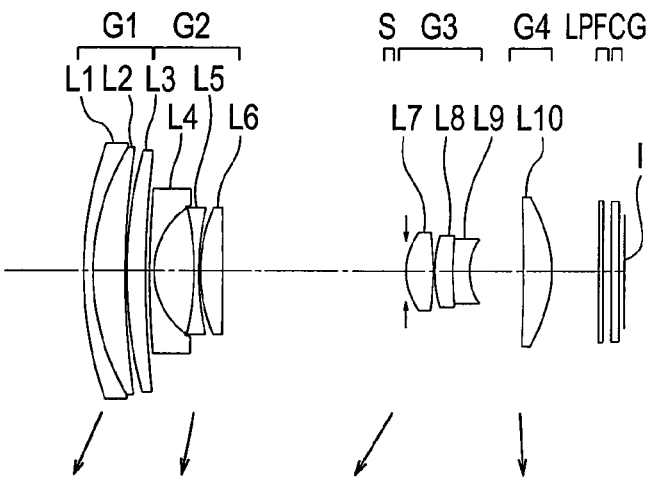
FIGS. 9A, 9B, and 9C are cross sectional views taken along the optical axis showing the optical configuration of a zoom lens according to embodiment 5 of the present invention in the state in which the zoom lens is focused on an object point at infinity, respectively at the wide angle end, at an intermediate focal length, and at the telephoto end.
Figure 9B:
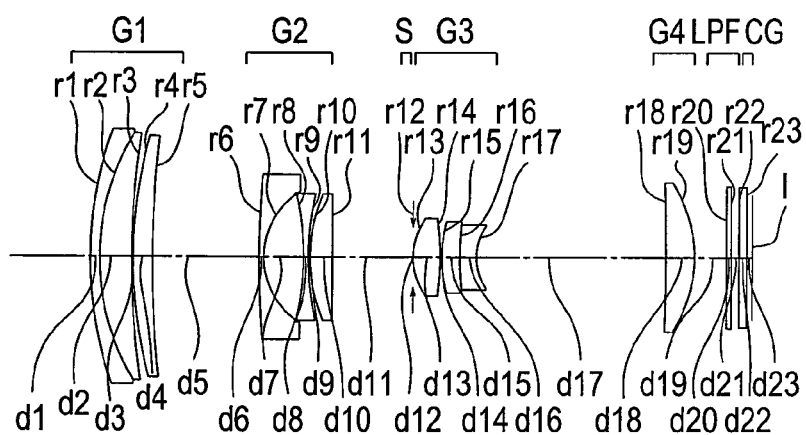
Figure 9C:
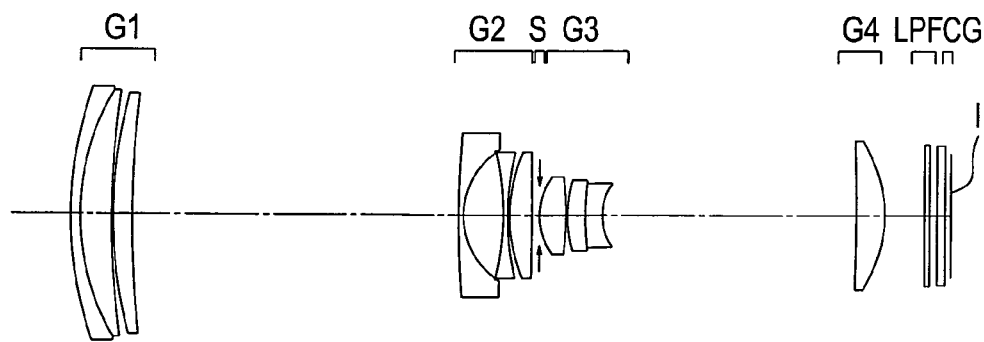

Next, a zoom lens according to embodiment 5 of the present invention will be described. FIGS. 9A, 9B, and 9C are cross sectional views taken along the optical axis showing the optical configuration of the zoom lens according to embodiment 5 of the present invention in the state in which the zoom lens is focused on an object point at infinity, where FIG. 9A is a cross sectional view of the zoom lens at the wide angle end, FIG. 9B is a cross sectional view of the zoom lens at an intermediate focal length position, and FIG. 9C is a cross sectional view of the zoom lens at the telephoto end.

Figure 10A:
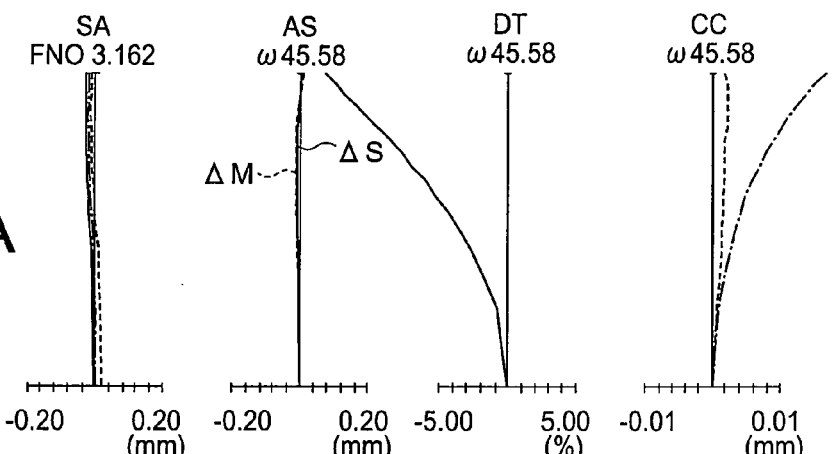
FIGS. 10A, 10B, and 10C are diagrams showing spherical aberration, astigmatism, distortion, and chromatic aberration of magnification of the zoom lens according to embodiment 5 in the state in which the zoom lens is focused on an object point at infinity, where
Figure 10B:
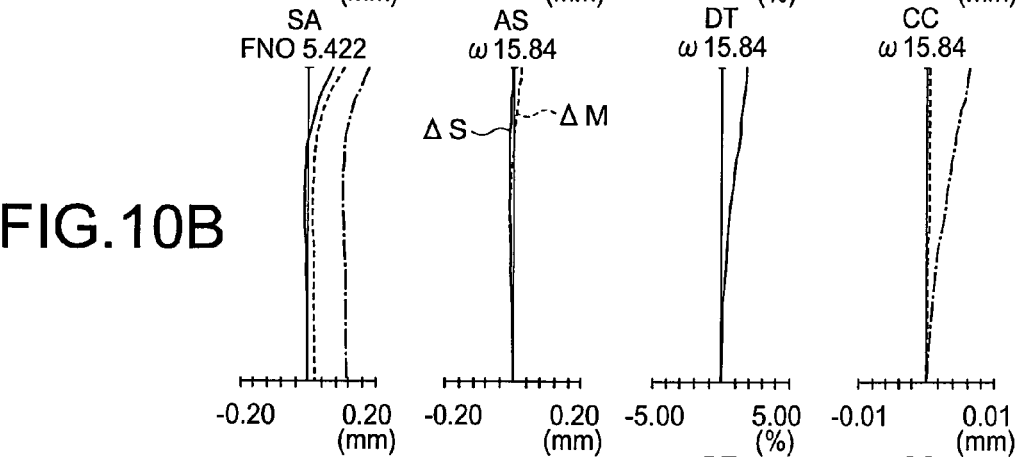
Figure 10C:
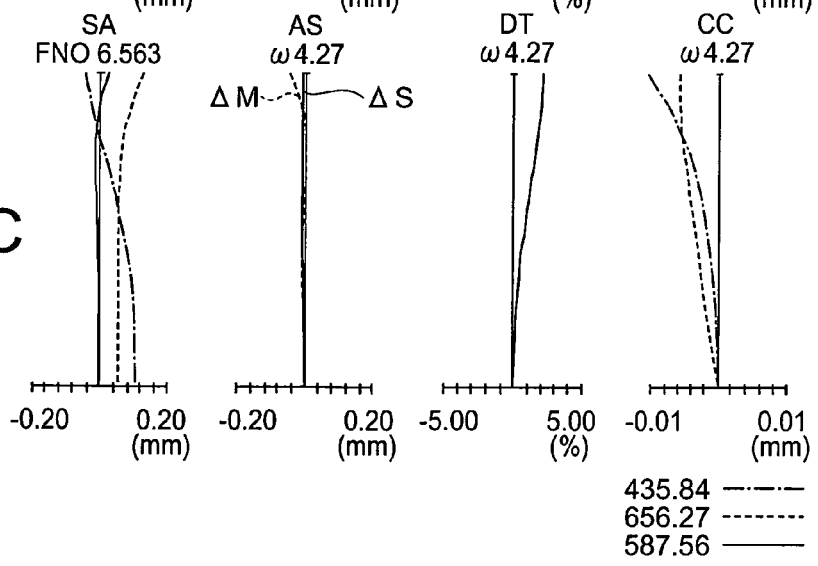

FIGS. 10A, 10B, and 10C are diagrams showing spherical aberration (SA), astigmatism (AS), distortion (DT), and chromatic aberration of magnification (CC) of the zoom lens according to embodiment 5 in the state in which the zoom lens is focused on an object point at infinity, where FIG. 10A is for the wide angle end, FIG. 10B is for the intermediate focal length position, and FIG. 10C is for the telephoto end.

As shown in FIGS. 9A, 9B, and 9C, the zoom lens according to embodiment 5 includes, in order from its object side, a first lens group G1, a second lens group G2, an aperture stop S, a third lens group G3, and a fourth lens group G4.

The first lens group G1 is composed of a cemented lens made up of a negative meniscus lens L1 having a convex surface directed toward the object side and a positive meniscus lens L2 having a convex surface directed toward the object side, and a positive meniscus lens L3 having a convex surface directed toward the object side. The first lens group G1 has a positive refracting power as a whole.

The second lens group G2 is composed of a negative meniscus lens L4 having a convex surface directed toward the object side, a biconcave negative lens L5, and a biconvex positive lens L6. The second lens group G2 has a negative refracting power as a whole.

The third lens group G3 is composed of a biconvex positive lens L7 and a cemented lens made up of a positive meniscus lens L8 and a negative meniscus lens L9 having a convex surface directed toward the object side. The third lens group G3 has a positive refracting power as a whole.

The fourth lens group G4 is composed of a positive meniscus lens L10 having a convex surface directed toward the image side. The fourth lens group G4 has a positive refracting power as a whole.

During zooming from the wide angle end to the telephoto end, the first lens group G1 moves toward the object side, the second lens group G2 moves toward the object side, the aperture stop S moves together with the third lens group G3, the third lens group G3 moves toward the object side, and the fourth lens group G4 moves first toward the image side and thereafter back toward the object side.

There are four aspheric surfaces in total, which include both surfaces of the biconvex positive lens L7 in the third lens group G3, the image side surface of the negative meniscus lens L9 in the third lens group G3, and the image side surface of the positive meniscus lens L10 in the fourth lens group G4.

Figure 11A:
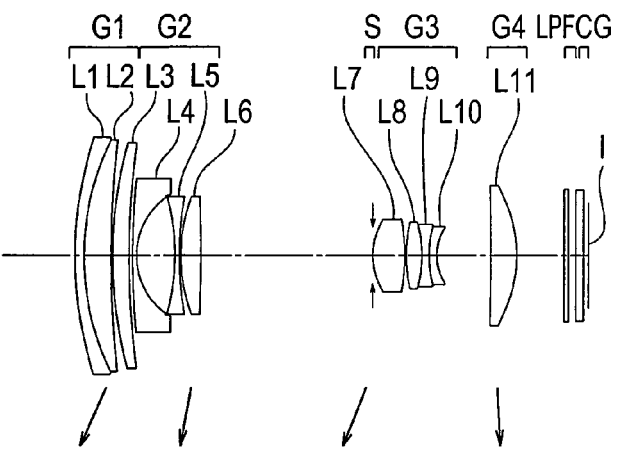
FIGS. 11A, 11B, and 11C are cross sectional views taken along the optical axis showing the optical configuration of a zoom lens according to embodiment 6 of the present invention in the state in which the zoom lens is focused on an object point at infinity, respectively at the wide angle end, at an intermediate focal length, and at the telephoto end.
Figure 11B:
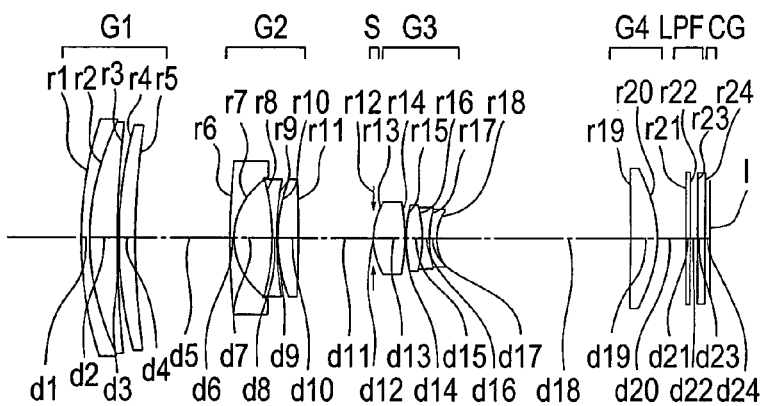
Figure 11C:
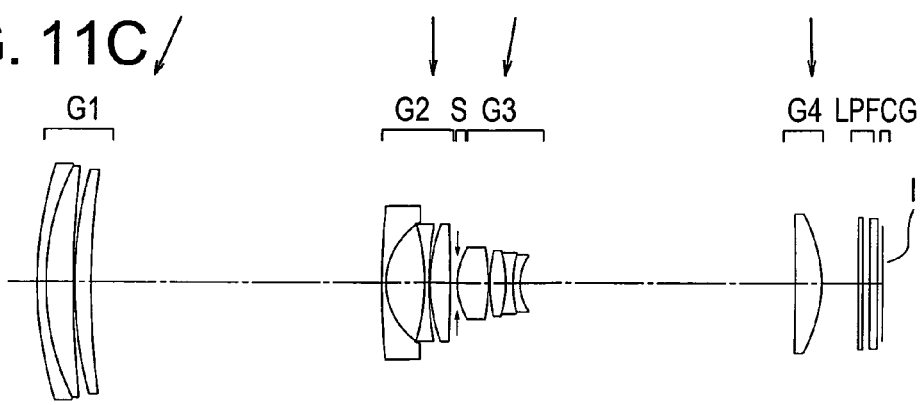

Next, a zoom lens according to embodiment 6 of the present invention will be described. FIGS. 11A, 11B, and 11C are cross sectional views taken along the optical axis showing the optical configuration of the zoom lens according to embodiment 6 of the present invention in the state in which the zoom lens is focused on an object point at infinity, where FIG. 11A is a cross sectional view of the zoom lens at the wide angle end, FIG. 11B is a cross sectional view of the zoom lens at an intermediate focal length position, and FIG. 11C is a cross sectional view of the zoom lens at the telephoto end.

FIGS. 12A, 12B, and 12C are diagrams showing spherical aberration (SA), astigmatism (AS), distortion (DT), and chromatic aberration of magnification (CC) of the zoom lens according to embodiment 6 in the state in which the zoom lens is focused on an object point at infinity, where FIG. 12A is for the wide angle end, FIG. 12B is for the intermediate focal length position, and FIG. 12C is for the telephoto end.

As shown in FIGS. 11A, 11B, and 11C, the zoom lens according to embodiment 6 includes, in order from its object side, a first lens group G1, a second lens group G2, an aperture stop S, a third lens group G3, and a fourth lens group G4.

The first lens group G1 is composed of a cemented lens made up of a negative meniscus lens L1 having a convex surface directed toward the object side and a positive meniscus lens L2 having a convex surface directed toward the object side, and a positive meniscus lens L3 having a convex surface directed toward the object side. The first lens group G1 has a positive refracting power as a whole.

The second lens group G2 is composed of a negative meniscus lens L4 having a convex surface directed toward the object side, a biconcave negative lens L5, and a biconvex positive lens L6. The second lens group G2 has a negative refracting power as a whole.

The third lens group G3 is composed of a biconvex positive lens L7 and a cemented lens made up of a biconvex positive lens L8, a biconcave negative lens L9 and a negative meniscus lens L10. The third lens group G3 has a positive refracting power as a whole.

The fourth lens group G4 is composed of a positive meniscus lens L11 having a convex surface directed toward the image side. The fourth lens group G4 has a positive refracting power as a whole.

During zooming from the wide angle end to the telephoto end, the first lens group G1 moves toward the object side, the second lens group G2 moves toward the object side, the aperture stop S moves together with the third lens group G3, the third lens group G3 moves toward the object side, and the fourth lens group G4 moves first toward the image side and thereafter back toward the object side.

There are four aspheric surfaces in total, which include both surfaces of the biconvex positive lens L7 in the third lens group G3, the image side surface of the biconcave negative lens L9 in the third lens group G3, and the image side surface of the positive meniscus lens L11 in the fourth lens group G4.

Numerical data of each embodiment described above is shown below. Apart from symbols described above, each of r1, r2, . . . denotes radius of curvature of each lens surface, each of d1, d2, denotes a distance between two lenses, each of nd1, nd2, . . . denotes a refractive index of each lens for a d-line, and each of vd1, vd2, . . . denotes an Abbe constant for each lens. Further, f denotes a focal length of the entire zoom lens system, $F_{NO}$ denotes an F number, ω denotes a half angle of field. Further, * denotes an aspheric data, ER denotes an effective radius, S denotes a stop.

When z is let to be an optical axis with a direction of traveling of light as a positive (direction), and y is let to be in a direction orthogonal to the optical axis, a shape of the aspheric surface is described by the following expression.

$$z=(y^2/r)/[1+\{1-(K+1)(y/r)^2\}^{1/2}]+A_4y^4+A_6y^6+A_8y^8+A_{10}y^{10}+A_{12}y^{12}$$

where, r denotes a paraxial radius of curvature, K denotes a conical coefficient, A4, A6, A8, A10, and $A_{12}$ denote aspherical surface coefficients of a fourth order, a sixth order, an eight order, a tenth order, and a twelfth order respectively. Moreover, in the aspherical surface coefficients, 'e–n' (where, n is an integral number) indicates '$10^{-n}$'.

These symbols are common in the following examples.

EXAMPLE 1

| Unit mm Surface data | | | | |
|---|---|---|---|---|
| Surface no. | r | d | nd | vd |
| Object plane | ∞ | ∞ | | |
| 1 | 27.321 | 0.70 | 1.84666 | 23.78 |

-continued

| | | | | |
|---|---|---|---|---|
| 2 | 15.861 | 2.25 | 1.72916 | 54.68 |
| 3 | 75.647 | 0.10 | | |
| 4 | 28.092 | 1.29 | 1.81600 | 46.62 |
| 5 | 64.546 | Variable | | |
| 6 | 60.757 | 0.30 | 1.88300 | 40.76 |
| 7 | 4.613 | 2.30 | | |
| 8 | −15.657 | 0.30 | 1.81600 | 46.62 |
| 9 | 19.310 | 0.10 | | |
| 10 | 9.524 | 1.22 | 1.94595 | 17.98 |
| 11 | 63.058 | Variable | | |
| 12(stop) | ∞ | 0.30 | | |
| 13* | 4.259 | 2.04 | 1.58313 | 59.38 |
| 14* | −16.341 | 0.10 | | |
| 15 | 10.379 | 2.40 | 2.10223 | 16.77 |
| 16* | 4.561 | Variable | | |
| 17 | −837.462 | 1.80 | 1.52542 | 55.78 |
| 18* | −8.355 | Variable | | |
| 19 | ∞ | 0.30 | 1.54771 | 62.84 |
| 20 | ∞ | 0.50 | | |
| 21 | ∞ | 0.50 | 1.51633 | 64.14 |
| 22 | ∞ | 0.37 | | |
| Image plane(Light receiving surface) ∞ | | | | |

Aspherical surface data

13th surface

K = −0.862
A4 = 3.83520e−04
14th surface

K = 0.000
A4 = 1.36330e−04
16th surface

K = 0.000
A4 = 2.70393e−03, A6 = 2.83818e−04, A8 = 1.94964e−05
18th surface

K = 0.000
A4 = 4.39028e−04, A6 = −3.27677e−06

Zoom data

| | Wide angle | Intermediate | Telephoto |
|---|---|---|---|
| Focal length | 4.33 | 13.25 | 51.96 |
| Fno. | 3.24 | 5.58 | 6.62 |
| Angle of field 2ω | 90.20 | 31.62 | 8.27 |
| fb (in air) | 4.79 | 3.49 | 3.77 |
| Lens total length(in air) | 33.23 | 42.76 | 54.58 |
| d5 | 0.25 | 6.78 | 18.94 |
| d11 | 10.04 | 5.03 | 0.70 |
| d16 | 2.96 | 12.26 | 15.98 |
| d18 | 3.40 | 2.12 | 2.50 |

Unit focal length f1 = 32.78    f2 = −5.33    f3 = 7.91    f4 = 16.05

EXAMPLE 2

Unit mm
Surface data

| Surface no. | r | d | nd | vd |
|---|---|---|---|---|
| Object plane | ∞ | ∞ | | |
| 1 | 30.852 | 0.70 | 1.84666 | 23.78 |
| 2 | 17.599 | 2.30 | 1.69680 | 55.53 |
| 3 | 120.183 | 0.10 | | |
| 4 | 31.925 | 1.25 | 1.81600 | 46.62 |
| 5 | 88.067 | Variable | | |
| 6 | 93.015 | 0.30 | 1.88300 | 40.76 |

-continued

| | | | | |
|---|---|---|---|---|
| 7 | 4.916 | 2.33 | | |
| 8 | −17.859 | 0.30 | 1.83481 | 42.71 |
| 9 | 16.203 | 0.10 | | |
| 10 | 9.640 | 1.33 | 1.92286 | 18.90 |
| 11 | 147.640 | Variable | | |
| 12(stop) | ∞ | 0.30 | | |
| 13* | 4.385 | 2.46 | 1.59201 | 67.02 |
| 14* | −22.373 | 0.10 | | |
| 15 | 9.017 | 2.20 | 2.10223 | 16.77 |
| 16* | 4.462 | Variable | | |
| 17 | −31.183 | 1.62 | 1.52542 | 55.78 |
| 18* | −8.000 | Variable | | |
| 19* | −10.000 | 0.80 | 1.52542 | 55.78 |
| 20 | −10.000 | 0.05 | | |
| 21 | ∞ | 0.50 | 1.51633 | 64.14 |
| Image plane(Light receiving surface) ∞ | | | | |

Aspherical surface data

13th surface

K = −0.737
A4 = 2.82606e−04, A6 = 1.68010e−05
14th surface

K = 0.000
A4 = 1.54761e−04, A6 = 3.11989e−05, A8 = −1.35452e−06
16th surface

K = 0.000
A4 = 2.49197e−03, A6 = 2.07529e−04, A8 = 3.29403e−05
18th surface

K = 0.000
A4 = 1.14543e−03, A6 = −2.40246e−05
19th surface

K = 0.000
A4 = 2.37052e−03, A6 = −7.37213e−05

Zoom data

| | Wide angle | Intermediate | Telephoto |
|---|---|---|---|
| Focal length | 4.50 | 13.77 | 52.20 |
| Fno. | 3.22 | 5.22 | 6.17 |
| Angle of field 2ω | 89.40 | 30.66 | 8.26 |
| fb (in air) | 1.18 | 1.18 | 1.21 |
| Lens total length(in air) | 34.84 | 43.90 | 54.84 |
| d5 | 0.25 | 8.05 | 20.01 |
| d11 | 10.95 | 5.35 | 0.70 |
| d16 | 2.78 | 10.97 | 14.24 |
| d18 | 3.50 | 2.16 | 2.50 |

Unit focal length f1 = 34.07    f2 = −5.60    f3 = 8.07    f4 = 20.00    f5 = 690.69

EXAMPLE 3

Unit mm
Surface data

| Surface no. | r | d | nd | vd |
|---|---|---|---|---|
| Object plane | ∞ | ∞ | | |
| 1 | 30.361 | 0.60 | 1.84666 | 23.78 |
| 2 | 17.252 | 1.92 | 1.72916 | 54.68 |
| 3 | 78.610 | 0.10 | | |
| 4 | 27.023 | 1.36 | 1.81600 | 46.62 |
| 5 | 69.430 | Variable | | |
| 6 | 66.914 | 0.30 | 1.88300 | 40.76 |
| 7 | 5.025 | 2.43 | | |
| 8 | −18.682 | 0.30 | 1.81600 | 46.62 |

-continued

| | | | | |
|---|---|---|---|---|
| 9 | 11.187 | 1.04 | 1.84666 | 23.78 |
| 10 | 24.622 | 0.10 | | |
| 11 | 10.341 | 1.14 | 1.92286 | 18.90 |
| 12 | 32.001 | Variable | | |
| 13(stop) | ∞ | −0.20 | | |
| 14* | 3.967 | 1.93 | 1.58313 | 59.38 |
| 15 | −19.639 | 0.10 | | |
| 16 | 9.443 | 2.20 | 2.10223 | 16.77 |
| 17* | 4.128 | Variable | | |
| 18 | −616.728 | 1.80 | 1.52542 | 55.78 |
| 19 | −9.231 | Variable | | |
| 20 | −10.000 | 0.80 | 1.52542 | 55.78 |
| 21 | −10.000 | 0.50 | | |
| 22 | ∞ | 0.50 | 1.51633 | 64.14 |
| 23 | ∞ | 0.37 | | |
| Image plane(Light receiving surface) ∞ | | | | |

Aspherical surface data

14th surface $K = -0.689$
$A4 = 2.51117e-04, A6 = -4.76981e-06$

17th surface $K = 0.000$
$A4 = 3.38109e-03, A6 = 3.68615e-04, A8 = 4.46073e-05$

Zoom data

| | Wide angle | Intermediate | Telephoto |
|---|---|---|---|
| Focal length | 4.46 | 13.64 | 53.49 |
| Fno. | 3.21 | 5.54 | 6.48 |
| Angle of field 2ω | 89.61 | 31.63 | 8.30 |
| fb (in air) | 1.19 | 1.21 | 1.14 |
| Lens total length(in air) | 34.21 | 42.69 | 54.16 |
| d5 | 0.25 | 6.45 | 19.08 |
| d12 | 10.83 | 5.11 | 0.50 |
| d17 | 2.80 | 11.81 | 15.02 |
| d19 | 3.22 | 2.19 | 2.50 |

Unit focal length f1 = 32.95  f2 = −5.58  f3 = 8.02  f4 = 17.82  f5 = 690.69

EXAMPLE 4

Unit mm
Surface data

| Surface no. | r | d | nd | vd |
|---|---|---|---|---|
| Object plane | ∞ | ∞ | | |
| 1 | 30.028 | 0.70 | 1.84666 | 23.78 |
| 2 | 16.000 | 2.05 | 1.69680 | 55.53 |
| 3 | 48.094 | 0.10 | | |
| 4 | 16.538 | 1.42 | 1.81600 | 46.62 |
| 5 | 38.137 | Variable | | |
| 6 | 36.169 | 0.30 | 1.88300 | 40.76 |
| 7 | 4.346 | 2.23 | | |
| 8 | −11.600 | 0.30 | 1.88300 | 40.76 |
| 9 | 30.688 | 0.10 | | |
| 10 | 11.304 | 1.49 | 1.92286 | 18.90 |
| 11 | −57.355 | Variable | | |
| 12(stop) | ∞ | −0.20 | | |
| 13* | 3.697 | 1.84 | 1.58313 | 59.38 |
| 14* | −16.650 | 0.10 | | |
| 15 | 7.278 | 1.42 | 2.10223 | 16.77 |
| 16* | 3.891 | Variable | | |
| 17 | −12.000 | 0.80 | 1.88300 | 40.76 |
| 18 | −17.664 | Variable | | |
| 19 | 187.382 | 1.80 | 1.52542 | 55.78 |
| 20* | −8.689 | Variable | | |

-continued

| | | | | |
|---|---|---|---|---|
| 21 | ∞ | 0.30 | 1.51633 | 64.14 |
| 22 | ∞ | 0.50 | | |
| 23 | ∞ | 0.50 | 1.51633 | 64.14 |
| 24 | ∞ | 0.37 | | |
| Image plane(Light receiving surface) ∞ | | | | |

Aspherical surface data

13th surface $K = -0.778$
$A4 = 8.78697e-04, A6 = -1.49682e-05$

14th surface $K = 0.000$
$A4 = -5.53777e-05$

16th surface $K = 0.000$
$A4 = 4.10604e-03, A6 = 3.13834e-04, A8 = 9.74974e-05,$
$A10 = 1.16729e-06$ 20th surface $K = 0.000$
$A4 = 7.59847e-04, A6 = 2.77660e-05, A8 = -2.26260e-06,$
$A10 = 3.44022e-08$ Zoom data

| | Wide angle | Intermediate | Telephoto |
|---|---|---|---|
| Focal length | 4.50 | 13.80 | 43.20 |
| Fno. | 3.05 | 5.45 | 6.58 |
| Angle of field 2ω | 87.86 | 30.40 | 9.90 |
| fb (in air) | 3.58 | 2.03 | 1.80 |
| Lens total length(in air) | 32.39 | 37.53 | 47.76 |
| d5 | 0.25 | 4.57 | 15.12 |
| d11 | 10.07 | 3.97 | 0.50 |
| d16 | 2.00 | 4.23 | 4.96 |
| d18 | 2.05 | 8.30 | 10.94 |
| d20 | 2.27 | 0.52 | 0.37 |

Unit focal length f1 = 30.49  f2 = −5.58  f3 = 7.15  f4 = −45.39  f5 = 15.85

EXAMPLE 5

Unit mm
Surface data

| Surface no. | r | d | nd | vd |
|---|---|---|---|---|
| Object plane | ∞ | ∞ | | |
| 1 | 25.153 | 0.60 | 1.84666 | 23.78 |
| 2 | 15.747 | 2.07 | 1.69680 | 55.53 |
| 3 | 55.881 | 0.10 | | |
| 4 | 30.860 | 1.22 | 1.83481 | 42.71 |
| 5 | 70.088 | Variable | | |
| 6 | 65.046 | 0.30 | 1.88300 | 40.76 |
| 7 | 5.060 | 2.57 | | |
| 8 | −17.940 | 0.30 | 1.88300 | 40.76 |
| 9 | 19.069 | 0.10 | | |
| 10 | 10.573 | 1.43 | 1.92286 | 18.90 |
| 11 | −305.006 | Variable | | |
| 12(stop) | ∞ | 0.00 | | |
| 13* | 4.152 | 1.72 | 1.58313 | 59.38 |
| 14* | −17.805 | 0.10 | | |
| 15 | 8.529 | 1.15 | 1.84666 | 23.78 |
| 16 | 20.000 | 1.08 | 2.00178 | 19.32 |
| 17* | 3.959 | Variable | | |
| 18 | −139.800 | 1.80 | 1.52542 | 55.78 |
| 19* | −8.126 | Variable | | |
| 20 | ∞ | 0.30 | 1.54771 | 62.84 |

-continued

| | | | | |
|---|---|---|---|---|
| 21 | ∞ | 0.50 | | |
| 22 | ∞ | 0.50 | 1.51633 | 64.14 |
| 23 | ∞ | 0.37 | | |
| Image plane(Light receiving surface) ∞ | | | | |

Aspherical surface data

13th surface

K = −0.518
14th surface

K = 0.000
A4 = 4.89028e−04
17th surface

K = 0.000
A4 = 2.59392e−03, A6 = 2.31576e−04, A8 = 5.71554e−05
19th surface

K = 0.000
A4 = 5.24849e−04, A6 = −4.45630e−06

Zoom data

| | Wide angle | Intermediate | Telephoto |
|---|---|---|---|
| Focal length | 4.33 | 13.25 | 50.23 |
| Fno. | 3.16 | 5.42 | 6.56 |
| Angle of field 2ω | 91.16 | 31.69 | 8.54 |
| fb (in air) | 4.36 | 3.38 | 3.88 |
| Lens total length(in air) | 34.40 | 42.11 | 55.87 |
| d5 | 0.25 | 6.84 | 20.73 |
| d11 | 11.81 | 5.23 | 0.50 |
| d17 | 3.45 | 12.13 | 16.22 |
| d19 | 2.96 | 2.00 | 2.50 |

Unit focal length f1 = 36.91   f2 = −6.13   f3 = 8.32   f4 = 16.34

EXAMPLE 6

Unit mm
Surface data

| Surface no. | r | d | nd | νd |
|---|---|---|---|---|
| Object plane | ∞ | ∞ | | |
| 1 | 27.449 | 0.60 | 1.84666 | 23.78 |
| 2 | 18.467 | 1.89 | 1.71031 | 70.00 |
| 3 | 74.362 | 0.10 | | |
| 4 | 30.443 | 1.12 | 1.88300 | 40.76 |
| 5 | 56.318 | Variable | | |
| 6 | 52.865 | 0.30 | 1.88300 | 40.76 |
| 7 | 4.994 | 2.67 | | |
| 8 | −15.135 | 0.30 | 1.88300 | 40.76 |
| 9 | 22.996 | 0.10 | | |
| 10 | 11.458 | 1.41 | 1.92286 | 18.90 |
| 11 | −107.086 | Variable | | |
| 12(stop) | ∞ | 0.00 | | |
| 13* | 4.656 | 2.15 | 1.59201 | 67.02 |
| 14* | −14.072 | 0.10 | | |
| 15 | 9.823 | 1.08 | 1.84666 | 23.78 |
| 16 | −9.019 | 0.50 | 1.92286 | 18.90 |
| 17 | 8.097 | 0.50 | 1.58313 | 59.38 |
| 18* | 3.790 | Variable | | |
| 19 | −294.822 | 1.80 | 1.52542 | 55.78 |
| 20* | −8.721 | Variable | | |
| 21 | ∞ | 0.30 | 1.54771 | 62.84 |
| 22 | ∞ | 0.50 | | |
| 23 | ∞ | 0.50 | 1.51633 | 64.14 |
| Image plane(Light receiving surface) ∞ | | | | |

Aspherical surface data

13th surface

K = −0.747
14th surface

K = 0.000
A4 = 2.99489e−04
18th surface

K = 0.000
A4 = 2.00620e−03, A6 = 2.56349e−04
20th surface

K = 0.000
A4 = 4.73359e−04, A6 = −3.27820e−06

Zoom data

| | Wide angle | Intermediate | Telephoto |
|---|---|---|---|
| Focal length | 4.33 | 13.25 | 50.22 |
| Fno. | 3.20 | 5.52 | 6.99 |
| Angle of field 2ω | 91.24 | 31.71 | 8.54 |
| fb (in air) | 4.67 | 3.37 | 3.87 |
| Lens total length(in air) | 34.99 | 42.94 | 57.70 |
| d5 | 0.25 | 6.55 | 19.93 |
| d11 | 11.77 | 5.16 | 0.50 |
| d18 | 3.69 | 13.24 | 18.79 |
| d20 | 3.28 | 2.00 | 2.50 |

Unit focal length f1 = 36.30   f2 = −6.07   f3 = 8.68   f4 = 17.07

Next, values of the conditional expressions of each of the examples are shown below:

| | Example1 | Example2 | Example3 |
|---|---|---|---|
| (1)($R_{1gf}$ + $R_{1gr}$)/($R_{1gf}$ − $R_{1gr}$) | −2.47 | −2.08 | −2.55 |
| (2)($R_{1f}$ + $R_{1r}$)/($R_{1f}$ − $R_{1r}$) | −2.13 | −1.69 | −2.26 |
| (3)($R_{2nf}$ + $R_{2nr}$)/($R_{2nf}$ − $R_{2nr}$) | 1.16 | 1.11 | 1.16 |
| (4)$f_{2n}/f_1$ | −0.173 | −0.173 | −0.187 |
| (5)($R_{3nf}$ + $R_{3nr}$)/($R_{3nf}$ − $R_{3nr}$) | 2.57 | 2.96 | 2.55 |
| (6)$\nu_{3n}$ | 16.77 | 16.77 | 16.77 |
| (7)$\nu_{3p}$ − $\nu_{3n}$ | 42.61 | 50.25 | 42.61 |
| (8)$f_t/f_w$ | 12 | 11.6 | 12 |
| (9)$y_{07}/(f_w \cdot \tan\omega_{07w})$ | 0.925 | 0.908 | 0.920 |
| (10)($T_{2W}$ − $T_{2T}$)/($f_W$) | 0.614 | 0.0542 | 0.250 |

| | Example4 | Example5 | Example6 |
|---|---|---|---|
| (1)($R_{1gf}$ + $R_{1gr}$)/($R_{1gf}$ − $R_{1gr}$) | −8.41 | −2.12 | −2.90 |
| (2)($R_{1f}$ + $R_{1r}$)/($R_{1f}$ − $R_{1r}$) | −4.32 | −2.64 | −2.17 |
| (3)($R_{2nf}$ + $R_{2nr}$)/($R_{2nf}$ − $R_{2nr}$) | 1.27 | 1.17 | 1.21 |
| (4)$f_{2n}/f_1$ | −0.184 | −0.169 | −0.172 |
| (5)($R_{3nf}$ + $R_{3nr}$)/($R_{3nf}$ − $R_{3nr}$) | 3.30 | 1.49 | 0.41 |
| (6)$\nu_{3n}$ | 16.77 | 19.32 | 18.9 |
| (7)$\nu_{3p}$ − $\nu_{3n}$ | 42.61 | 40.06 | 48.1 |
| (8)$f_t/f_w$ | 9.6 | 11.6 | 11.6 |
| (9)$y_{07}/(f_w \cdot \tan\omega_{07w})$ | 0.933 | 0.923 | 0.9120 |
| (10)($T_{2W}$ − $T_{2T}$)/($f_W$) | 0.111 | 0.227 | 0.700 |

Thus, it is possible to use such image forming optical system of the present invention in a photographic apparatus in which an image of an object is photographed by an electronic image pickup element such as a CCD and a CMOS, particularly a digital camera and a video camera, a personal computer, a telephone, and a portable terminal which are examples of an information processing unit, particularly a portable telephone which is easy to carry. Embodiments thereof will be exemplified below.

Figure 13:
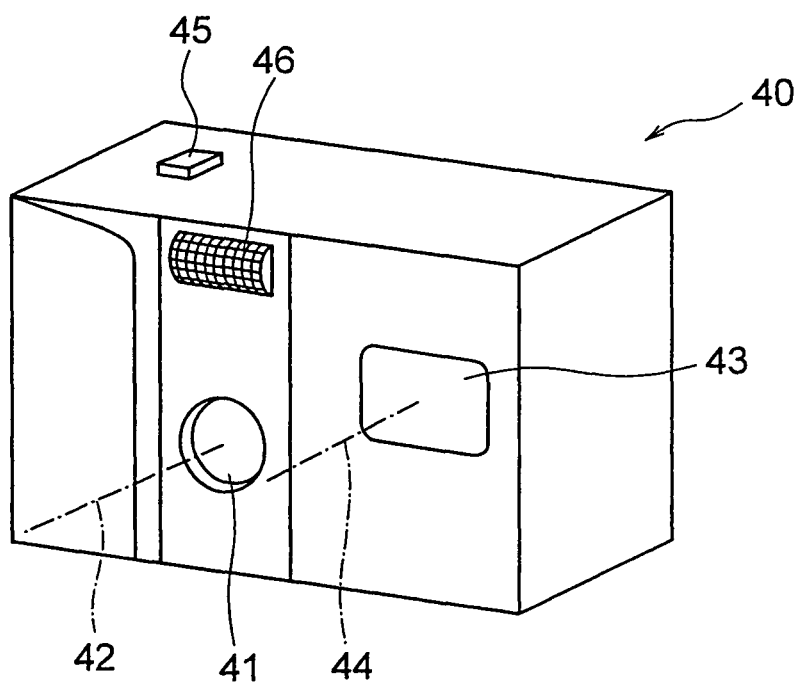
FIG. 13 is a front perspective view showing an outer appearance of a digital camera 40 equipped with a zoom optical system according to the present invention.
Figure 14:
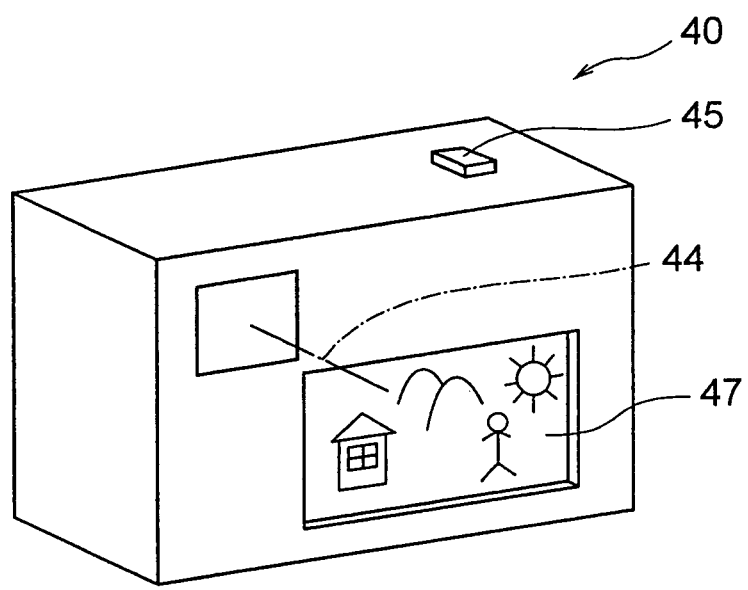
FIG. 14 is a rear perspective view of the digital camera 40.
Figure 15:
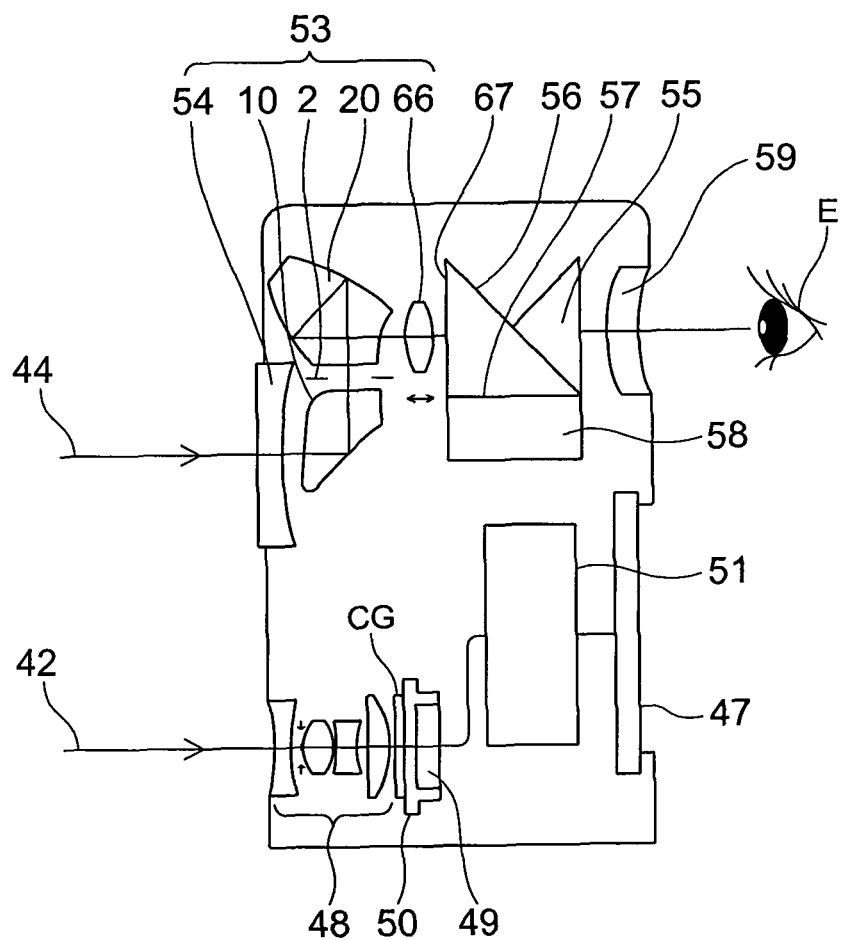
FIG. 15 is a cross sectional view showing the optical construction of the digital camera 40.

In FIG. 13 to FIG. 15 show conceptual diagrams of structures in which the image forming optical system according to the present invention is incorporated in a photographic optical system 41 of a digital camera. FIG. 13 is a frontward perspective view showing an appearance of a digital camera 40, FIG. 14 is a rearward perspective view of the same, and FIG. 15 is a cross-sectional view showing an optical arrangement of the digital camera 40.

The digital camera 40, in a case of this example, includes the photographic optical system 41 (an objective optical system for photography 48) having an optical path for photography 42, a finder optical system 43 having an optical path for finder 44, a shutter 45, a flash 46, and a liquid-crystal display monitor 47. Moreover, when the shutter 45 disposed at an upper portion of the camera 40 is pressed, in conjugation with this, a photograph is taken through the photographic optical system 41 (objective optical system for photography 48) such as the zoom lens in the first embodiment.

An object image formed by the photographic optical system 41 (photographic objective optical system 48) is formed on an image pickup surface 50 of a CCD 49. The object image photoreceived at the CCD 49 is displayed on the liquid-crystal display monitor 47 which is provided on a camera rear surface as an electronic image, via an image processing means 51. Moreover, a memory etc. is disposed in the image processing means 51, and it is possible to record the electronic image photographed. This memory may be provided separately from the image processing means 51, or may be formed by carrying out by writing by recording (recorded writing) electronically by a floppy (registered trademark) disc, memory card, or an MO etc.

Furthermore, an objective optical system for finder 53 is disposed in the optical path for finder 44. This objective optical system for finder 53 includes a cover lens 54, a first prism 10, an aperture stop 2, a second prism 20, and a lens for focusing 66. An object image is formed on an image forming surface 67 by this objective optical system for finder 53. This object image is formed in a field frame of a Porro prism which is an image erecting member equipped with a first reflecting surface 56 and a second reflecting surface 58. On a rear side of this Porro prism, an eyepiece optical system 59 which guides an image formed as an erected normal image is disposed.

By the digital camera 40 structured in such manner, it is possible to realize an optical image pickup apparatus having a zoom lens with a reduced size and thickness, in which the number of structural components is reduced.

Figure 16:
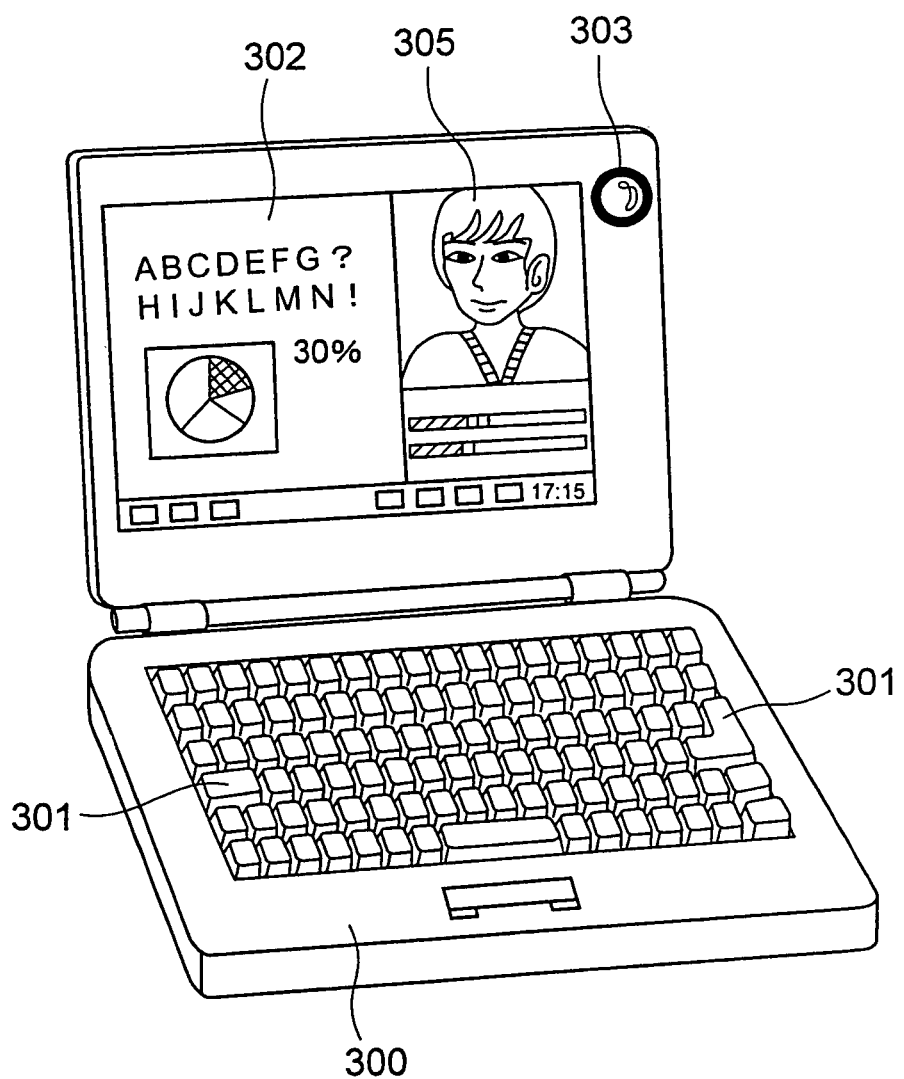
FIG. 16 is a front perspective view showing a personal computer 300 as an example of an information processing apparatus in which a zoom optical system according to the present invention is provided as an objective optical system, in a state in which the cover is open.
Figure 17:
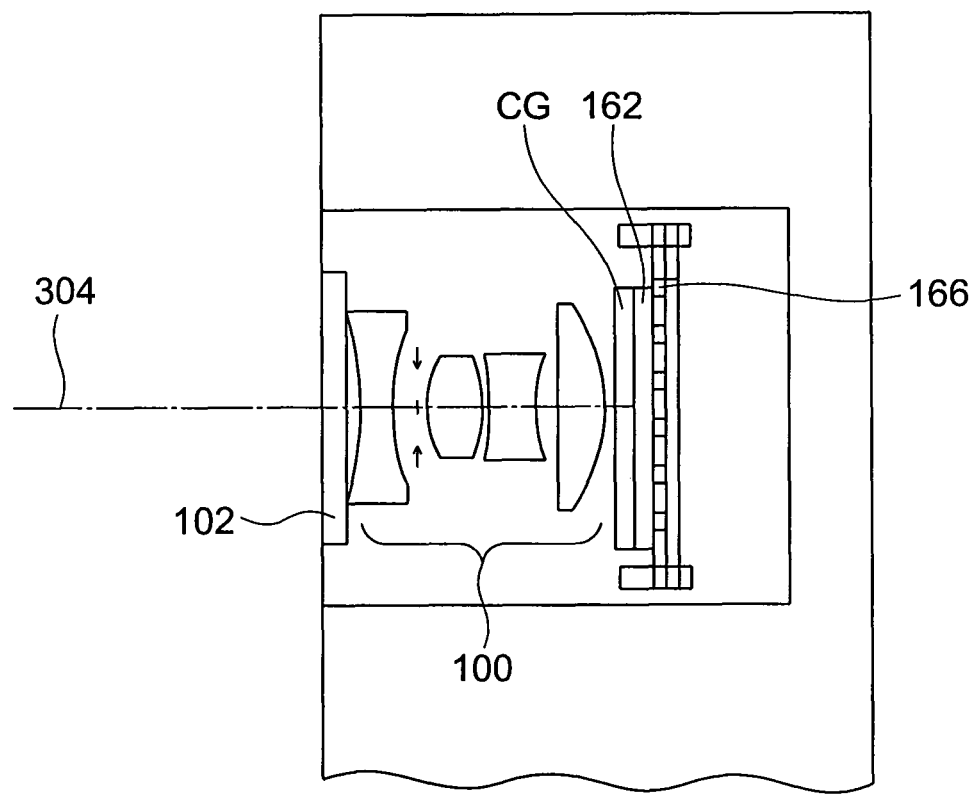
FIG. 17 is a cross sectional view of a taking optical system 303 of the personal computer 300.
Figure 18:
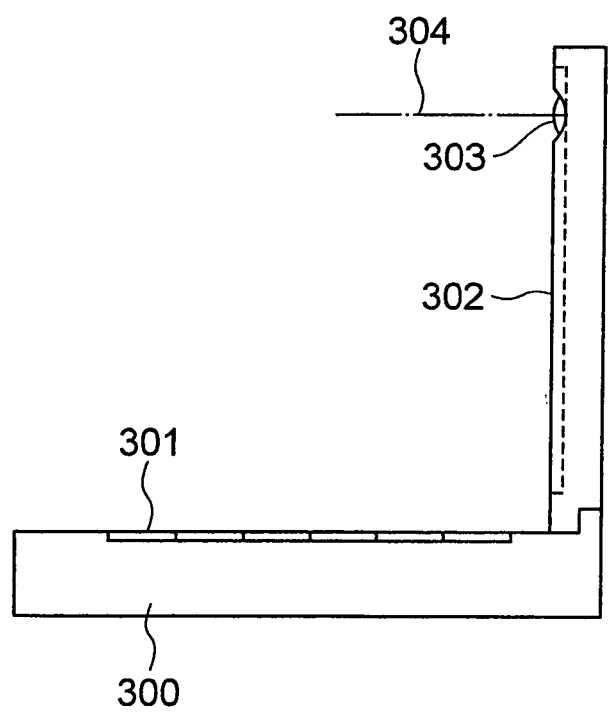
FIG. 18 is a side view of the personal computer 300.

Next, a personal computer which is an example of an information processing apparatus with a built-in image forming system as an objective optical system is shown in FIG. 16 to FIG. 18. FIG. 16 is a frontward perspective view of a personal computer 300 with its cover opened, FIG. 17 is a cross-sectional view of a photographic optical system 303 of the personal computer 300, and FIG. 18 is a side view of FIG. 16. As it is shown in FIG. 16 to FIG. 18, the personal computer 300 has a keyboard 301, an information processing means and a recording means, a monitor 302, and a photographic optical system 303.

Here, the keyboard 301 is for an operator to input information from an outside. The information processing means and the recording means are omitted in the diagram. The monitor 302 is for displaying the information to the operator. The photographic optical system 303 is for photographing an image of the operator or a surrounding. The monitor 302 may be a display such as a liquid-crystal display or a CRT display. As the liquid-crystal display, a transmission liquid-crystal display device which illuminates from a rear surface by a backlight not shown in the diagram, and a reflection liquid-crystal display device which displays by reflecting light from a front surface are available. Moreover, in the diagram, the photographic optical system 303 is built-in at a right side of the monitor 302, but without restricting to this location, the photographic optical system 303 may be anywhere around the monitor 302 and the keyboard 301.

This photographic optical system 303 has an objective optical system 100 which includes the zoom lens in the first embodiment for example, and an electronic image pickup element chip 162 which receives an image. These are built into the personal computer 300.

At a front end of a mirror frame, a cover glass 102 for protecting the objective optical system 100 is disposed.

An object image received at the electronic image pickup element chip 162 is input to a processing means of the personal computer 300 via a terminal 166. Further, the object image is displayed as an electronic image on the monitor 302. In FIG. 16, an image 305 photographed by the user is displayed as an example of the electronic image. Moreover, it is also possible to display the image 305 on a personal computer of a communication counterpart from a remote location via a processing means. For transmitting the image to the remote location, the Internet and telephone are used.

Figure 19A:
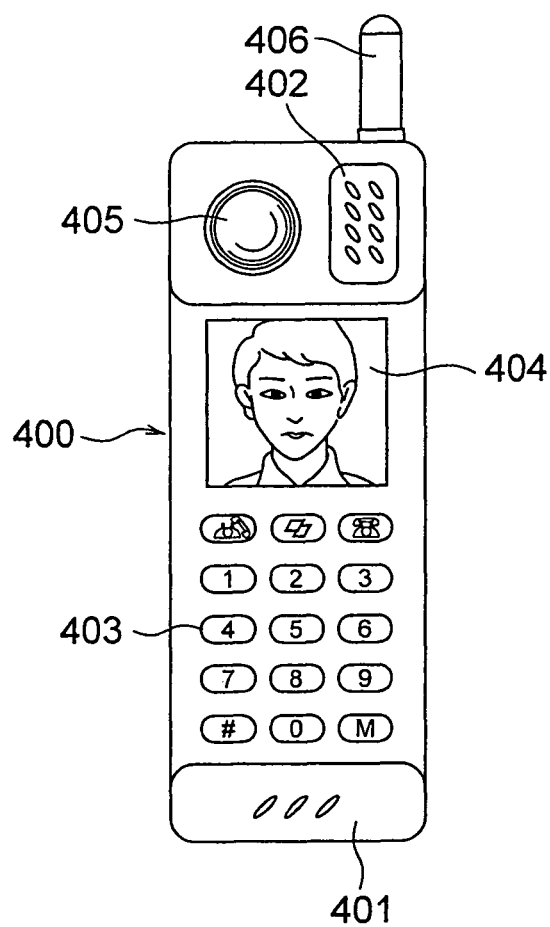
FIGS. 19A, 19B, and 19C show a cellular phone 400 as an example of an information processing apparatus in which a zoom optical system according to the present invention is provided as a taking optical system, where
Figure 19B:
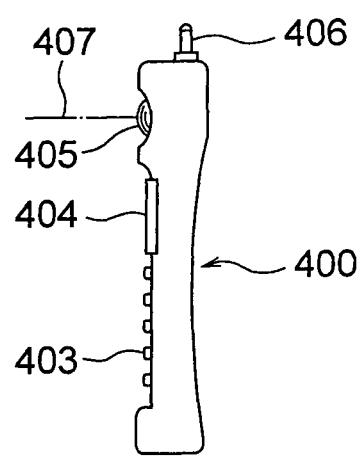
Figure 19C:
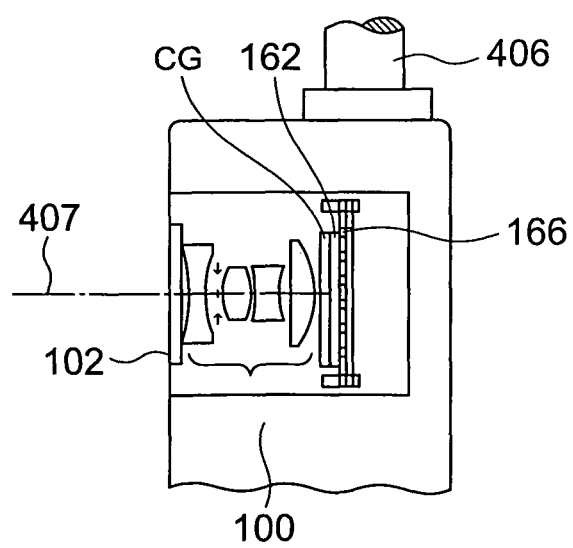

Next, a telephone which is an example of an information processing apparatus in which the image forming optical system of the present invention is built-in as a photographic optical system, particularly a portable telephone which is easy to carry is shown in FIG. 19A, FIG. 19B, and FIG. 19C. FIG. 19A is a front view of a portable telephone 400, FIG. 19B is a side view of the portable telephone 400, and FIG. 19C is a cross-sectional view of a photographic optical system 405. As shown in FIG. 19A to FIG. 19C, the portable telephone 400 includes a microphone section 401, a speaker section 402, an input dial 403, a monitor 404, the photographic optical system 405, an antenna 406, and a processing means.

Here, the microphone section 401 is for inputting a voice of the operator as information. The speaker section 402 is for outputting a voice of the communication counterpart. The input dial 403 is for the operator to input information. The monitor 404 is for displaying a photographic image of the operator himself and the communication counterpart, and information such as a telephone number. The antenna 406 is for carrying out a transmission and a reception of communication electric waves. The processing means (not shown in the diagram) is for carrying out processing of image information, communication information, and input signal etc.

Here, the monitor 404 is a liquid-crystal display device. Moreover, in the diagram, a position of disposing each structural element is not restricted in particular to a position in the diagram. This photographic optical system 405 has an objective optical system 100 which is disposed in a photographic optical path 407 and an image pickup element chip 162 which receives an object image. As the objective optical system 100, the zoom lens in the first embodiment for example, is used. These are built into the portable telephone 400.

At a front end of a mirror frame, a cover glass 102 for protecting the objective optical system 100 is disposed.

An object image received at the electronic image pickup element chip 162 is input to an image processing means which is not shown in the diagram, via a terminal 166. Further, the object image finally displayed as an electronic image on the monitor 404 or a monitor of the communication counterpart, or both. Moreover, a signal processing function is included in the processing means. In a case of transmitting an image to the communication counterpart, according to this function, information of the object image received at the electronic image pickup element chip 162 is converted to a signal which can be transmitted.

Various modifications can be made to the present invention without departing from its essence.

As described in the foregoing, the image forming optical system and the electronic image pickup apparatus according to the present invention are advantageous in achieving a reduction in the size, a wide angle of view, an adequate zoom ratio, and good image quality of picked-up images.

The present invention can provide an image forming optical system that is advantageous in achieving a reduction in the size, a wide angle of view, an adequate zoom ratio, and good image quality of picked-up images.

Furthermore, the present invention can provide an image forming optical system that can be manufacture at low cost.

The present invention can also provide an electronic image pickup apparatus equipped with such an image forming optical system.

What is claimed is:

1. An image forming optical system comprising four or five lens groups in total including, in order from its object side to image side, a first lens group having a positive refracting power, a second lens group having a negative refracting power, a third lens group having a positive refracting power, and a fourth lens group having a refracting power, wherein
during zooming from the wide angle end to the telephoto end, the distance between the first lens group and the second lens group increases, the distance between the second lens group and the third lens group decreases, and the distance between the third lens group and the fourth lens group changes,
the first lens group comprises three lenses including a negative meniscus lens, a positive meniscus lens, and a positive lens,
the second lens group includes a negative meniscus lens having a convex surface directed toward the object side and a concave surface directed toward the image side, the negative meniscus lens being located closest to the object side in the second lens group,
the position of the second lens group at the telephoto end is closer to the object side than that at the wide angle end,
the image forming optical system has an aperture stop that moves integrally with the third lens group,
the third lens group includes a positive lens component and a negative lens component, and
the fourth lens group consists of one lens.

2. The image forming optical system according to claim 1, wherein the first lens group is located closer to the object side at the telephoto end than at the wide angle end.

3. The image forming optical system according to claim 1, wherein the negative meniscus lens in the first lens group is located closer to the object side than the positive meniscus lens in the first lens group, the image side surface of the negative meniscus lens in the first lens group has a paraxial radius of curvature that is smaller in the absolute value than that of the object side surface thereof, and the image side surface of the positive meniscus lens in the first lens group has a paraxial radius of curvature that is larger in the absolute value than that of the object side surface thereof.

4. The image forming optical system according to claim 1, wherein both the negative meniscus lens and the positive meniscus lens in the first lens group are meniscus lenses that are convex toward the object side.

5. The image forming optical system according to claim 1, wherein the negative meniscus lens and the positive meniscus lens in the first lens group are cemented together.

6. The image forming optical system according to claim 1, wherein the second lens group has a positive lens and a negative lens located on the image side of the negative meniscus lens.

7. The image forming optical system according to claim 1, wherein the second lens group comprises the negative meniscus lens, the positive lens, and the negative lens.

8. The image forming optical system according to claim 1, wherein the negative lens in the second lens group has an aspheric surface.

9. The image forming optical system according to claim 1, wherein the third lens group is located closer to the object side at the telephoto end than at the wide angle end.

10. The image forming optical system according to claim 1, wherein the third lens group comprises two lenses including, in order from the object side, a positive lens and a negative lens.

11. The image forming optical system according to claim 1, wherein the third lens group comprises three lenses including, in order from the object side, a positive lens, a positive lens, and a negative lens.

12. The image forming optical system according to claim 1, wherein the positive lens in the third lens group has a biconvex shape, and the negative lens in the third lens group has a meniscus shape with a convex surface facing the object side and a concave surface facing the image side.

13. The image forming optical system according to claim 1, wherein both the object side surface and the image side surface of the positive lens in the third lens group are aspheric surfaces.

14. The image forming optical system according to claim 1, wherein the image side surface of the negative lens in the third lens group is an aspheric surface.

15. The image forming optical system according to claim 1, wherein the focusing operation from an object at a long distance to an object at a short distance is performed by moving the fourth lens group.

16. The image forming optical system according to claim 1, wherein the fourth lens group consists of one positive lens.

17. The image forming optical system according to claim 1, wherein the fourth lens group consists of one negative lens.

18. The image forming optical system according to claim 16, wherein the fourth lens group consists of a meniscus lens having an aspheric surface.

19. The image forming optical system according to claim 17, wherein the fourth lens group consists of a biconcave lens having an aspheric surface.

20. The image forming optical system according to claim 1, wherein the first lens group satisfies the following condition:

$$-10<(R_{1gf}+R_{1gr})/(R_{1gf}-R_{1gr})<-1.5 \quad (1)$$

where $R_{1gf}$ is the paraxial radius of curvature of the lens surface located closest to the object side in the first lens group, and $R_{1gr}$ is the paraxial radius of curvature of the lens surface located closest to the image side in the first lens group.

21. The image forming optical system according to claim 1, wherein the first lens group satisfies the following condition:

$$-5.5<(R_{1f}+R_{1r})/(R_{1f}-R_{1r})<-2.5 \quad (2),$$

where $R_{1f}$ is the paraxial radius of curvature of the object side surface of the lens component located closest to the object side in the first lens group, and $R_{1r}$ is the paraxial radius of curvature of the image side lens surface of the lens component located closest to the image side in the first lens group.

22. The image forming optical system according to claim 1, wherein the negative meniscus lens component in the second lens group satisfies the following condition:

$$0.9<(R_{2nf}+R_{2nr})/(R_{2nf}-R_{2nr})<1.5 \quad (3),$$

where $R_{2nf}$ is the paraxial radius of curvature of the object side surface of the negative meniscus lens component in the second lens group, and $R_{2nr}$ is the paraxial radius of curvature of the image side surface of the negative meniscus lens component in the second lens group.

23. The image forming optical system according to claim 1, wherein the first lens group and the negative meniscus lens component in the second lens group satisfy the following condition:

$$-0.3<f_{2n}/f_1<-0.13 \quad (4),$$

where $f_{2n}$ is the focal length of the negative meniscus lens in the second lens group, and $f_1$ is the focal length of the first lens group.

24. The image forming optical system according to claim 1, wherein the negative lens in the third lens group satisfies the following condition:

$$0.1<(R_{3nf}+R_{3nr})/(R_{3nf}-R_{3nr})<4.5 \quad (5)$$

where $R_{3nf}$ is the paraxial radius of curvature of the object side surface of the negative lens in the third lens group, and $R_{3nr}$ is the paraxial radius of curvature of the image side surface of the negative lens in the third lens group.

25. The image forming optical system according to claim 1, wherein the negative lens in the third lens group satisfies the following condition:

$$12<v_{3n}<35 \quad (6),$$

where $v_{3n}$ is the Abbe constant of the negative lens in the third lens group.

26. The image forming optical system according to claim 1, wherein the positive lens and the negative lens in the third lens group satisfy the following condition:

$$30<v_{3p}-v_{3n}<70 \quad (7),$$

where $v_{3p}$ is the Abbe constant of the positive lens in the third lens group, and $v_{3n}$ is the Abbe constant of the negative lens in the third lens group.

27. The image forming optical system according to claim 1, wherein the image forming optical system satisfy the following condition:

$$7<ft/fw \quad (8),$$

where fw is the focal length of the entire image forming optical system at the wide angle end, and ft is the focal length of the entire image forming optical system at the telephoto end.

28. An electronic image pickup apparatus comprising the image forming optical system according to claim 1, and an image pickup element that has an image pickup surface provided on the image side of the image forming optical system and converts an optical image formed on the image pickup surface by the image forming optical system into an electrical signal.

29. The electronic image pickup apparatus according to claim 28 further comprising a signal processing circuit that processes the image data obtained by picking up an image by the image pickup element and outputs image data representing the image having a changed shape, wherein the following condition is satisfied in the state in which the image forming optical system is focused on an object at the farthest distance at the wide angle end:

$$0.65<y_{07}/(f_w\cdot\tan\omega_{07w})<0.98 \quad (9),$$

where $f_w$ is the focal length of the entire image forming optical system at the wide angle end, and $y_{07}$ is expressed by equation $y_{07}=0.7 \times y_{10}$, $y_{10}$ being the distance from the center of an effective image pickup area of the image pickup element to a point farthest from the center within the effective image pickup area and having a largest value among the possible values if the effective image pickup area changes during zooming from the wide angle end to the telephoto end, and $\omega_{07w}$ is the angle formed in the object space between the optical axis and a principal ray that is incident on an image position having an image height equal to $y_{07}$ from the center of the image pickup surface at the wide angle end.

\* \* \* \* \*